United States Patent
Kim et al.

(10) Patent No.: US 11,870,591 B2
(45) Date of Patent: Jan. 9, 2024

(54) TIME LIMIT FOR HARQ RETRANSMISSION

(71) Applicant: LG Electronics Inc., Seoul (KR)

(72) Inventors: Jinmin Kim, Seoul (KR); Jinsoo Choi, Seoul (KR); Kiseon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 17/600,885

(22) PCT Filed: Nov. 22, 2019

(86) PCT No.: PCT/KR2019/016174
§ 371 (c)(1),
(2) Date: Oct. 1, 2021

(87) PCT Pub. No.: WO2020/204298
PCT Pub. Date: Oct. 8, 2020

(65) Prior Publication Data
US 2022/0158773 A1 May 19, 2022

Related U.S. Application Data

(60) Provisional application No. 62/828,487, filed on Apr. 3, 2019.

(30) Foreign Application Priority Data
Apr. 1, 2019 (KR) .......................... 10-2019-0037928

(51) Int. Cl.
*H04L 1/18* (2023.01)
*H04L 1/1829* (2023.01)
(Continued)

(52) U.S. Cl.
CPC .......... *H04L 1/1835* (2013.01); *H04L 1/1812* (2013.01); *H04L 1/1848* (2013.01); *H04W 84/12* (2013.01)

(58) Field of Classification Search
CPC ... H04L 1/1822; H04L 1/1896; H04L 1/1819; H04L 1/1614; H04L 1/1685;
(Continued)

(56) References Cited

U.S. PATENT DOCUMENTS 10,454,632 B2 * 10/2019 Li .......................... H04L 1/1812
10,686,566 B2 * 6/2020 You ....................... H04L 1/1812
(Continued)

FOREIGN PATENT DOCUMENTS

WO   WO2015006640   1/2015
WO   WO2016190578   12/2016

OTHER PUBLICATIONS

Dan et al., "Discussion on HARQ for EHT," IEEE 802.11-18/1963r1, dated Nov. 2018, 10 pages.
(Continued)

*Primary Examiner* — Jung Liu
(74) *Attorney, Agent, or Firm* — Fish & Richardson P.C.

(57) ABSTRACT

In a wireless local area network (WLAN) system, a first station (STA) may transmit first information related to a maximum value of a hybrid automatic repeat request (HARQ) index supported by the first STA, and second information related to a time limit related to the HARQ index. The HARQ index may be used for an HARQ operation of the first STA, and the time limit may be used for a maximum storage time of an HARQ buffer related to the HARQ index. The first STA may perform an association with a second STA on the basis of the first information and the second information.

14 Claims, 33 Drawing Sheets

(51) Int. Cl.
*H04L 1/1812* (2023.01)
*H04W 84/12* (2009.01)

(58) Field of Classification Search
CPC ........... H04L 1/1621; H04L 2001/0093; H04L 1/1893; H04L 1/1887; H04L 1/1812; H04L 1/189; H04L 1/1861
See application file for complete search history.

(56) References Cited

U.S. PATENT DOCUMENTS

| | | | |
|---|---|---|---|
| 10,999,014 B2 * | 5/2021 | Tian | H04L 1/1864 |
| 2015/0236822 A1 | 8/2015 | Pirskanen et al. | |
| 2017/0346606 A1 * | 11/2017 | Li | H04L 1/1822 |
| 2019/0334661 A1 * | 10/2019 | You | H04L 1/1812 |
| 2021/0399838 A1 * | 12/2021 | Lou | H04L 1/08 |
| 2021/0409165 A1 * | 12/2021 | Wang | H04L 1/1822 |
| 2022/0361117 A1 * | 11/2022 | Jeon | H04W 16/28 |
| 2022/0376843 A1 * | 11/2022 | Bergman | H04L 1/1671 |

OTHER PUBLICATIONS

Oteri et al., "Effect of Preamble Decoding on HARQ in 802.11be," IEEE 802.11-19/0390r0, dated Mar. 2019, 16 pages.

* cited by examiner

FIG. 2
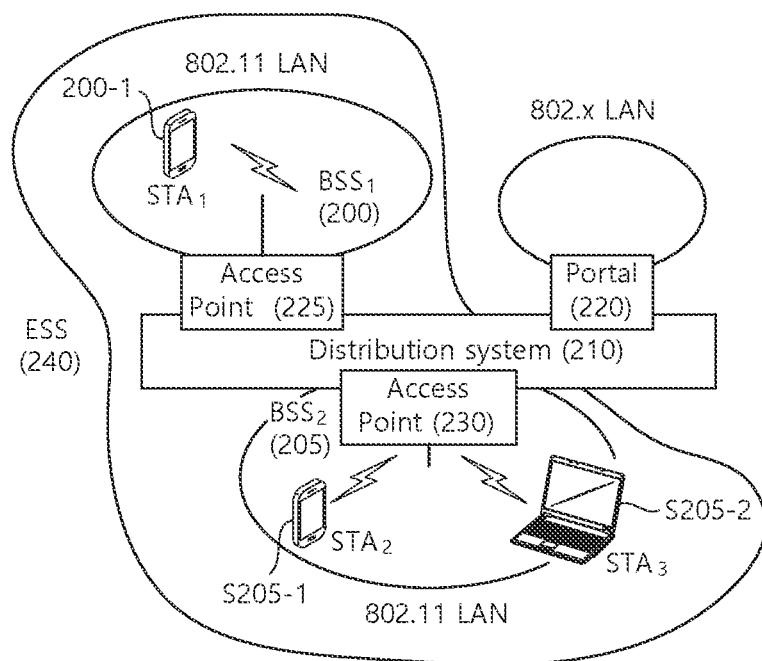
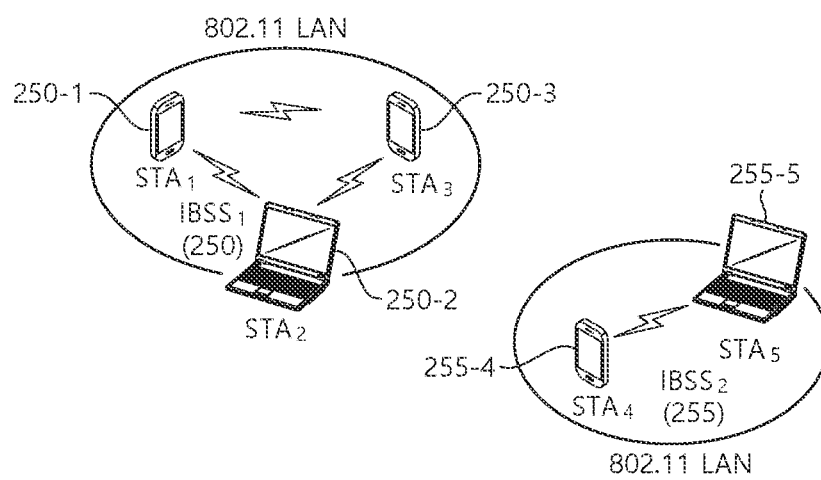

FIG. 4
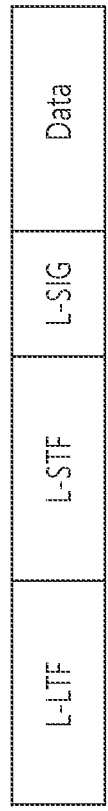
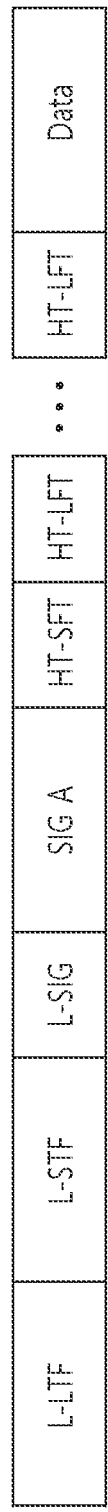
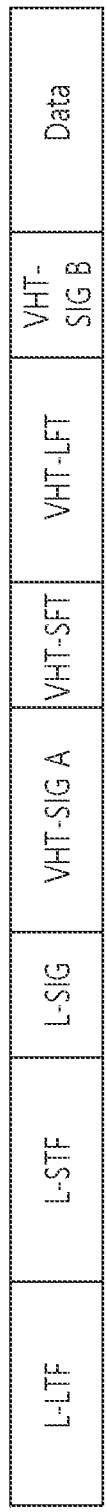
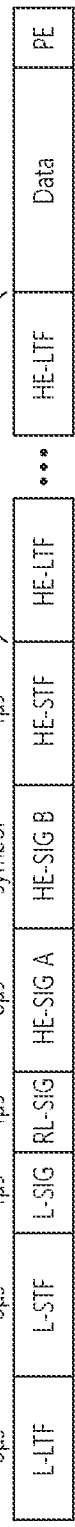

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

…

TIME LIMIT FOR HARQ RETRANSMISSION

CROSS-REFERENCE TO RELATED APPLICATIONS

This application is a National Stage application under 35 U.S.C. § 371 of International Application No. PCT/KR2019/016174, filed on Nov. 22, 2019, which claims the benefit of Korean Patent Application No. 10-2019-0037928, filed on Apr. 1, 2019, and U.S. Provisional Application No. 62/828,487, filed on Apr. 3, 2019. The disclosures of the prior applications are incorporated by reference in their entirety.

BACKGROUND

Technical Field

The present specification relates to a time limit for hybrid automatic repeat request (HARQ) retransmission in a wireless local area network (WLAN) system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present disclosure proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

The present disclosure proposes technical features that can be improved in a conventional wireless LAN (WLAN) or can be utilized in a new communication standard. For example, the new communication standard may be an extreme high throughput (EHT) specification that is being discussed recently. The EHT standard may use a newly proposed increased bandwidth, an improved PHY protocol data unit (PPDU) structure, an improved sequence, a hybrid automatic repeat request (HARQ) technique, a multi-link, and the like.

SUMMARY

A method performed in a wireless local area network (WLAN) system according to various embodiments relates to a technical feature of a first station (STA) performing hybrid automatic repeat request (HARQ) retransmission. For example, the first STA may transmit first information related to a maximum value of an HARQ index supported by the first STA and second information related to a time limit related to the HARQ index, wherein the HARQ index may be used for an HARQ operation of the first STA and the time limit may be used for a maximum storage time of an HARQ buffer related to the HARQ index. The first STA may perform association with a second STA based on the first information and the second information.

According to an example of the present specification, a STA supporting HARQ may flush a buffer when a time limit expires. Since the buffer may be emptied after a certain time, it is possible to reduce the amount of data stored in the buffer of the STA performing an HARQ operation. Further, an HARQ procedure may be simplified, thus enabling efficient communication.

BRIEF DESCRIPTION OF THE DRAWINGS

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

DESCRIPTION OF EXEMPLARY EMBODIMENTS

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example." Specifically, "control information (EHT-Signal)" may mean that the "EHT-Signal" is proposed as an example of the "control information". Further, "control information (i.e., EHT-Signal)" may also mean that the "EHT-Signal" is proposed as an example of the "control information."

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

Figure 1:
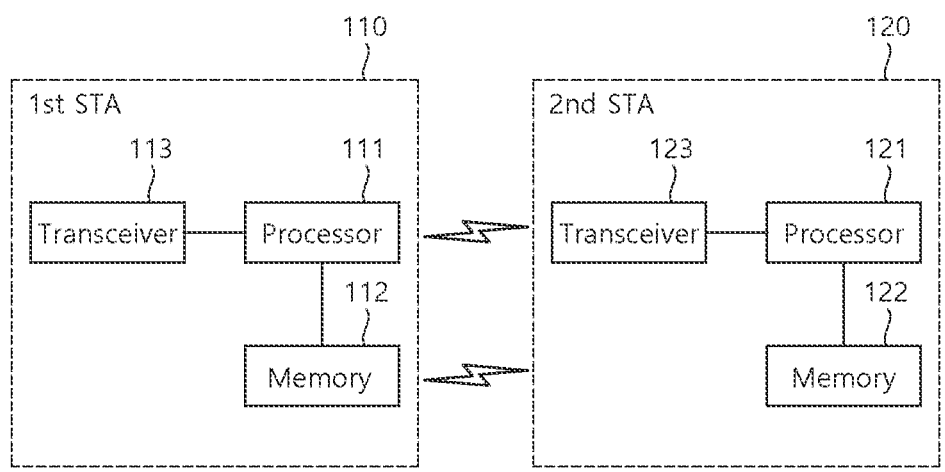
FIG. 1 illustrates an example of a transmitting apparatus and/or a receiving apparatus of the present specification.

FIG. 1 illustrates an example of a transmitting apparatus and/or a receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
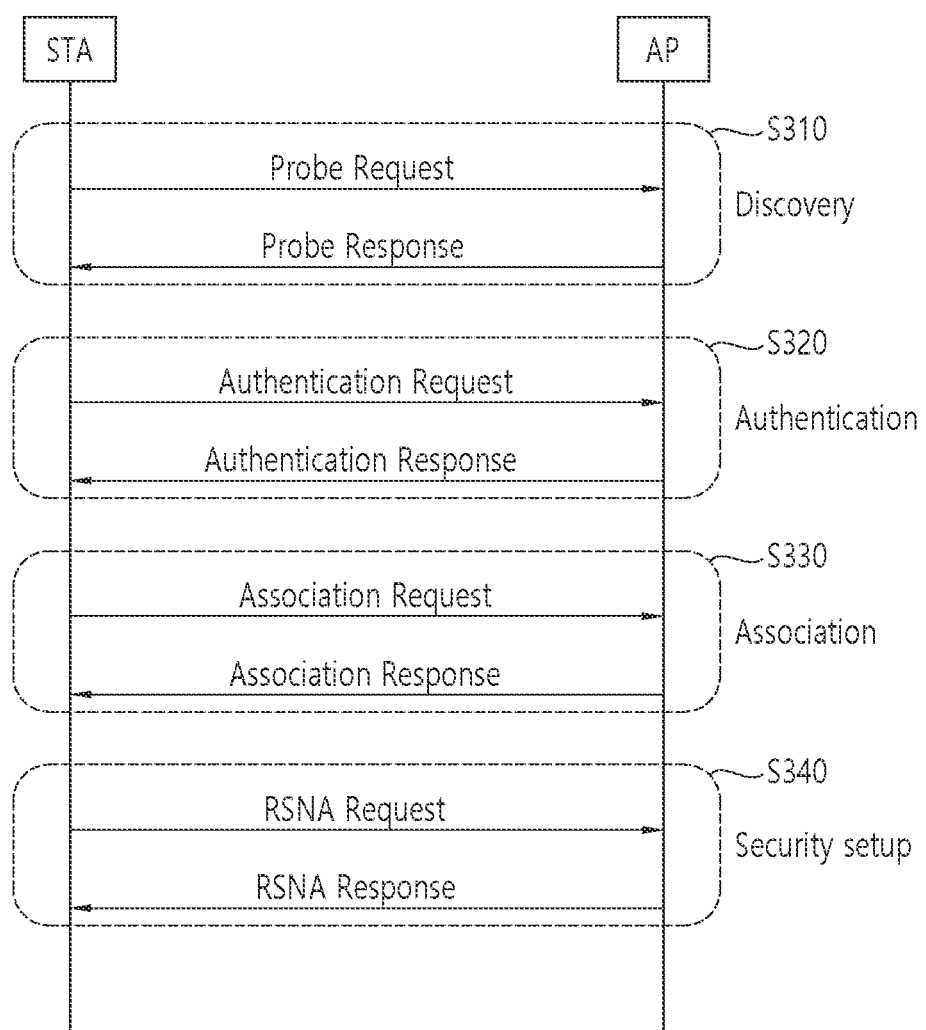
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
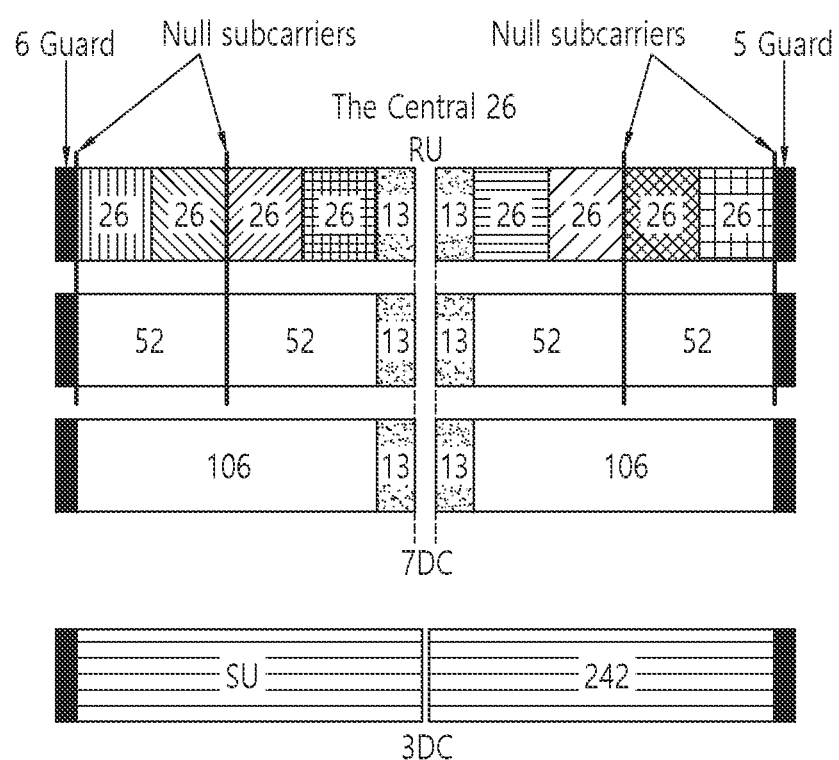
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
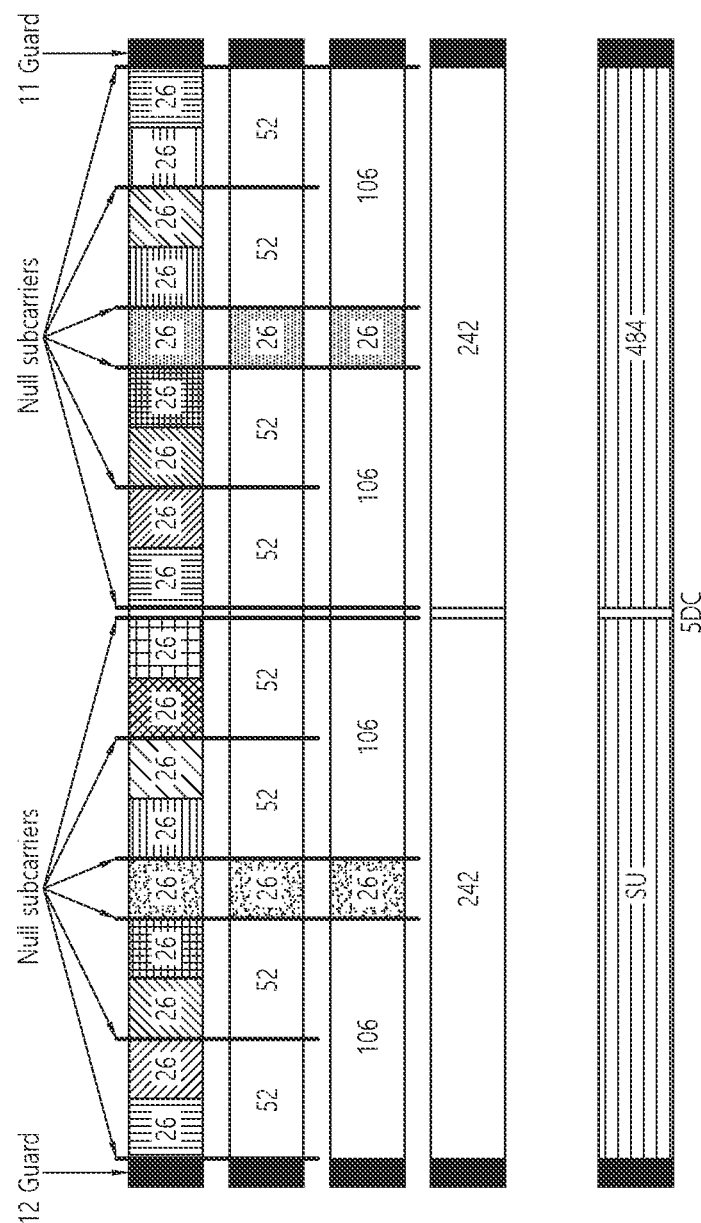
FIG. 6 illustrates a layout of resource units (RUs) used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
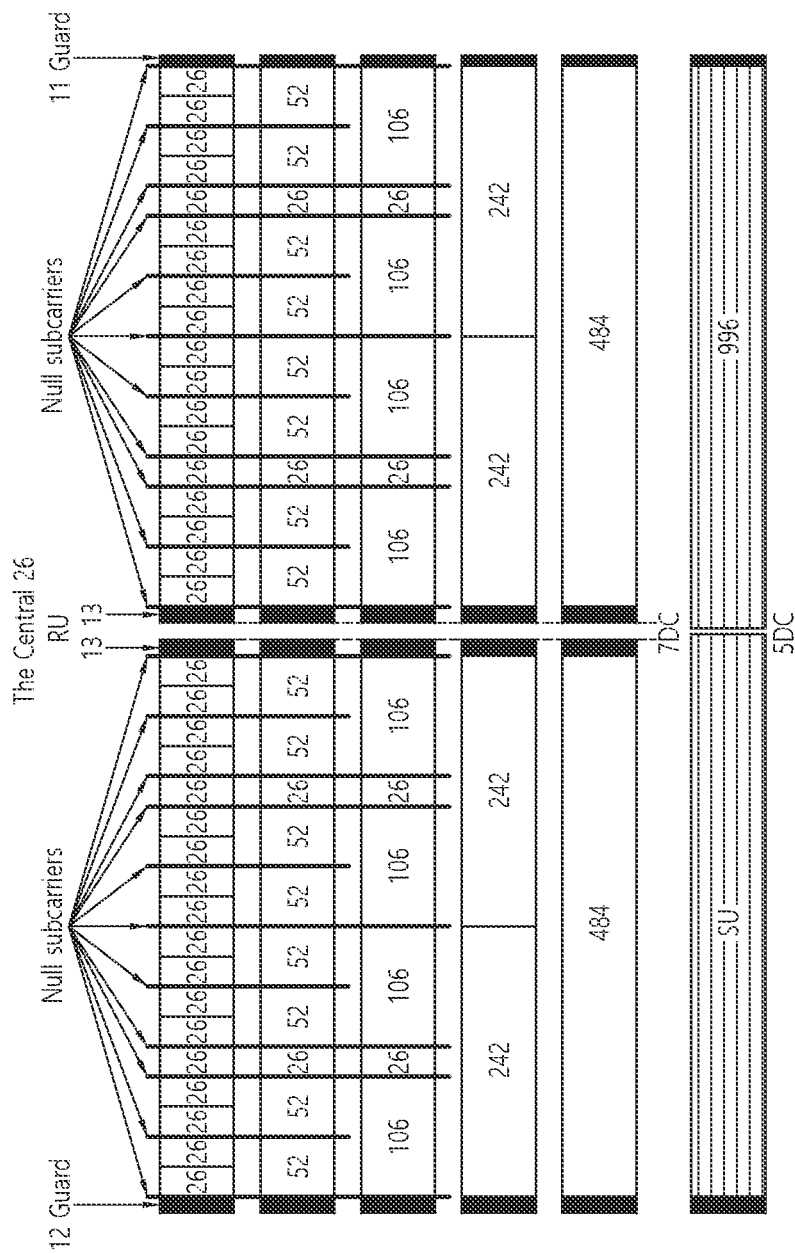
FIG. 7 illustrates a layout of resource units (RUs) used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
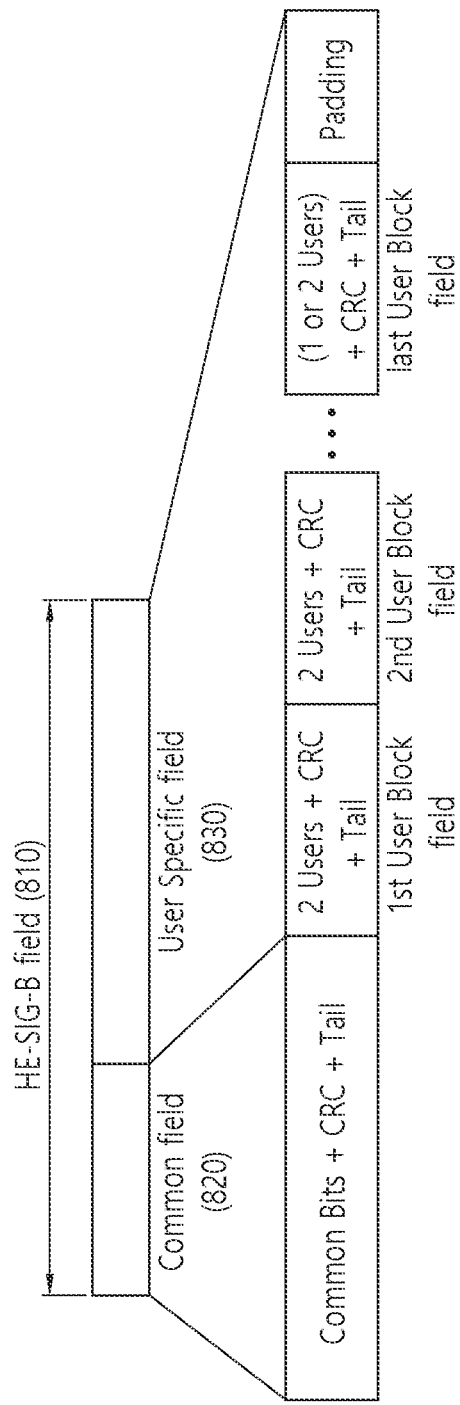
FIG. 8 illustrates the structure of an HE-SIG-B field.

FIG. 8 illustrates the structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
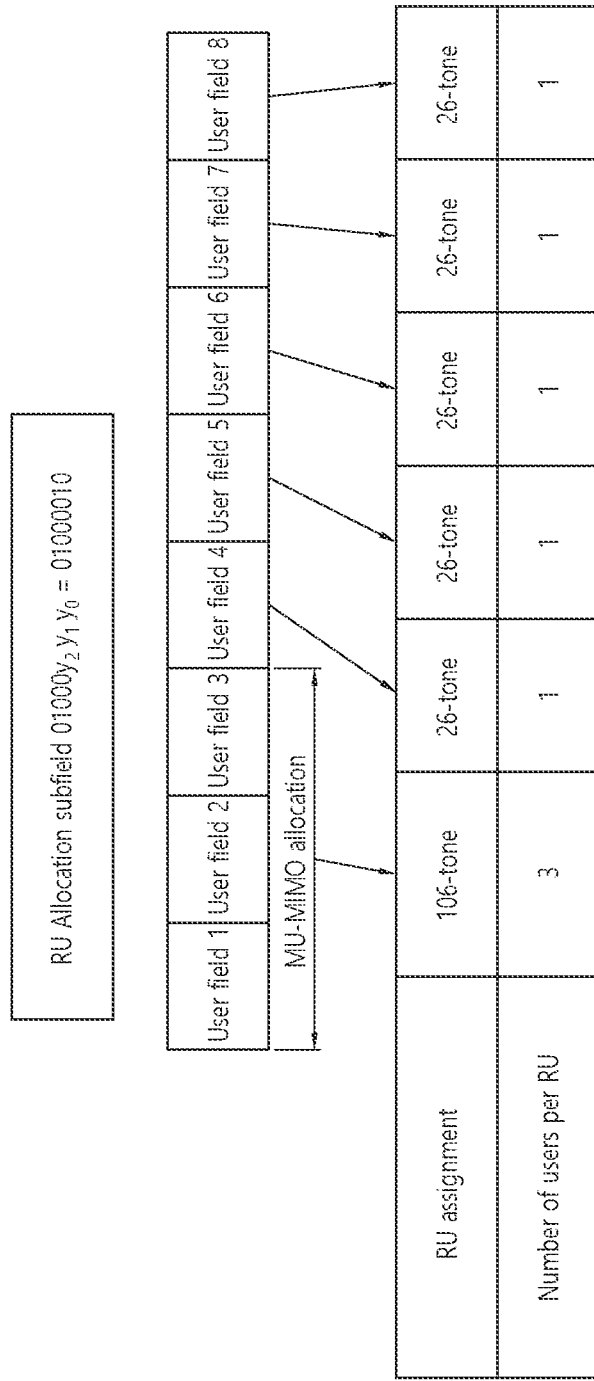
FIG. 9 illustrates an example in which a plurality of user STAs is allocated to the same RU through a MU-MIMO scheme.

FIG. 9 illustrates an example in which a plurality of user STAs is allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
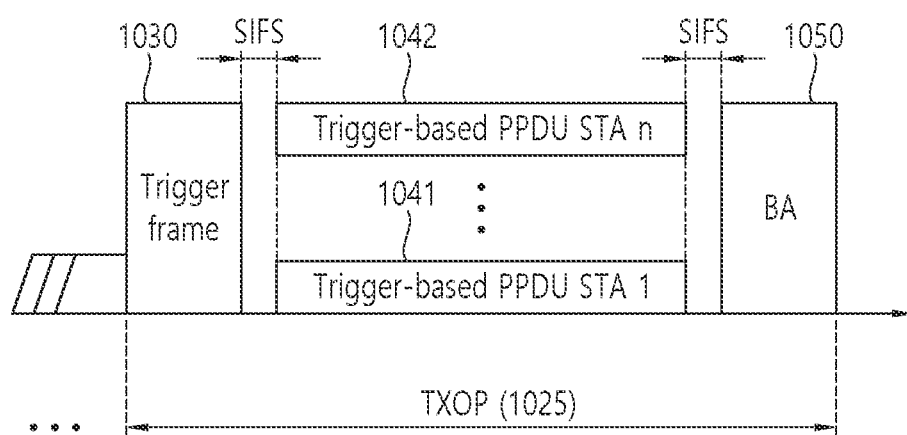
FIG. 10 illustrates a UL-MU operation.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
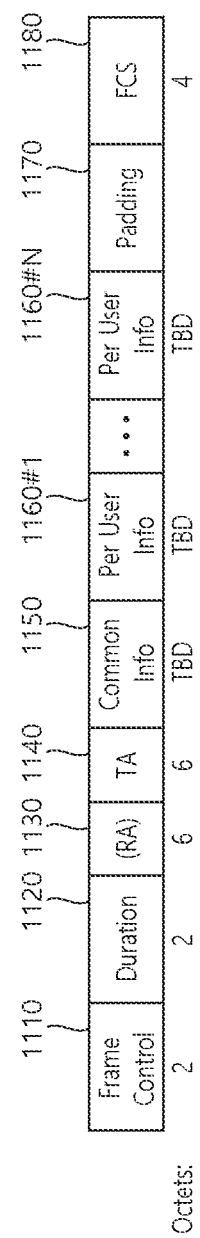
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
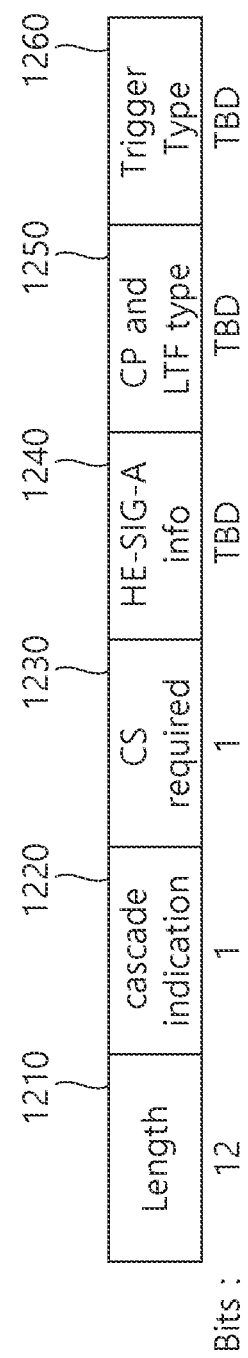
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
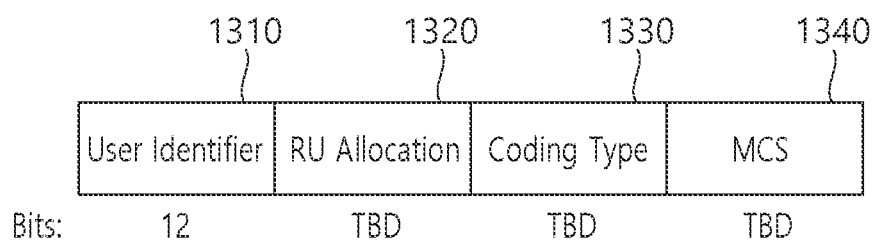
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
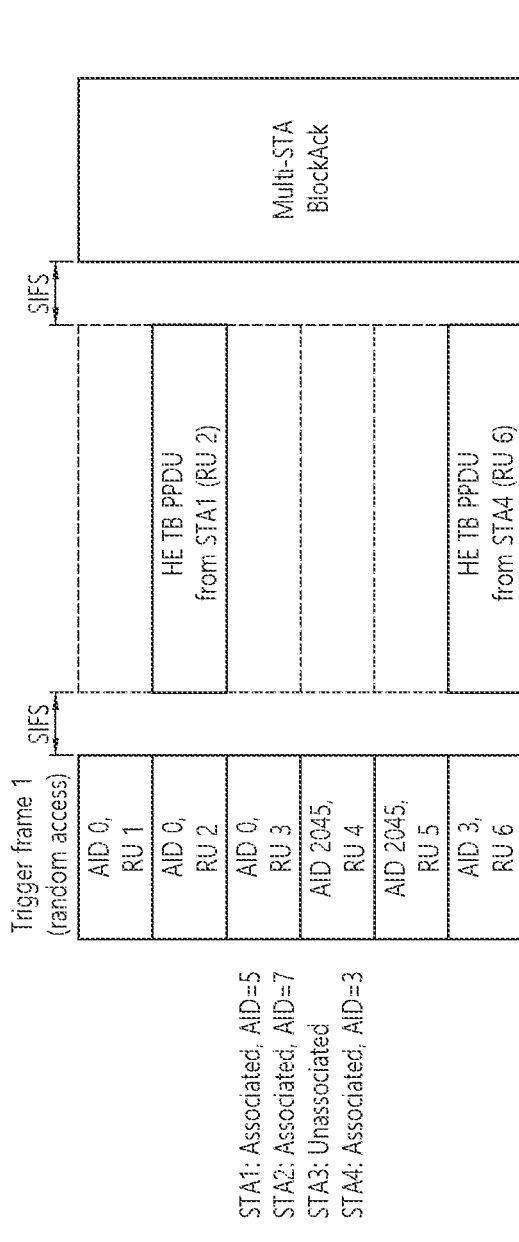
FIG. 14 illustrates a technical feature of a UORA scheme.

FIG. 14 describes a technical feature of a UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
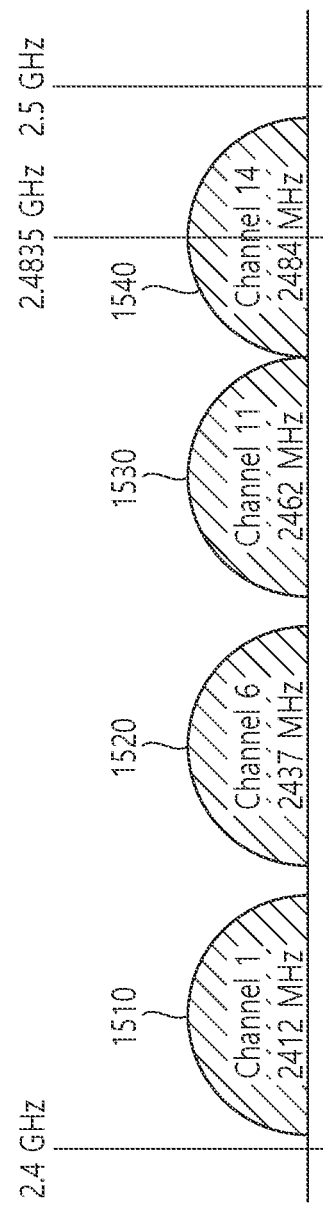
FIG. 15 illustrates an example of a channel used/supported/defined in a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
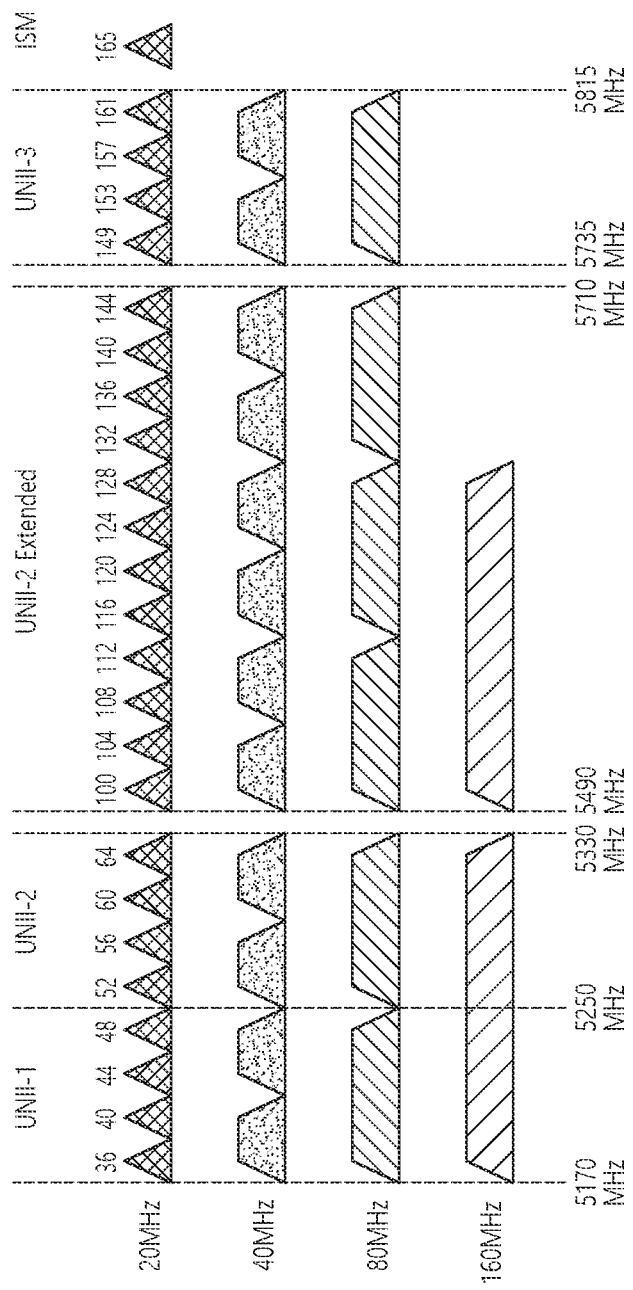
FIG. 16 illustrates an example of a channel used/supported/defined in a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
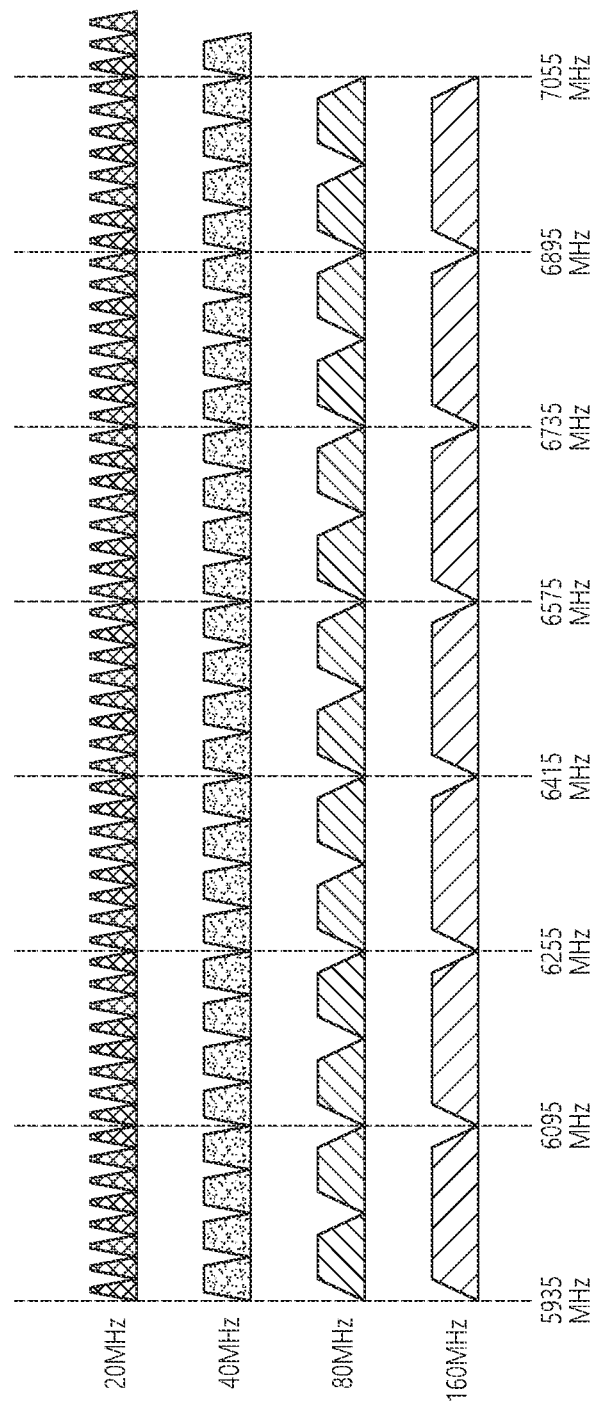
FIG. 17 illustrates an example of a channel used/supported/defined in a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Hereinafter, the HARQ technique applied to some embodiments of the present specification will be described.

The HARQ technique may be a technique combining a forward error correction (FEC) scheme and an automatic repeat request (ARQ) scheme. According to the HARQ method, the performance can be improved by checking whether data received by the PHY layer includes an error that cannot be decoded, and requesting retransmission when an error occurs.

The HARQ receiver may basically attempt error correction on received data and determine whether to retransmit or not by using an error detection code. The error detection code may be various codes. For example, in the case of using a cyclic redundancy check (CRC), when an error of received data is detected through a CRC detection process, the receiver may transmit a non-acknowledgement (NACK) signal to the transmitter. Upon receiving the NACK signal, the transmitter may transmit appropriate retransmission data according to the HARQ mode. The receiver receiving the retransmission data could improve reception performance by combining and decoding the previous data and the retransmission data.

The mode of HARQ can be classified into chase combining and incremental redundancy (IR). Chase combining is a method of obtaining a signal-to-noise ratio (SNR) gain by combining data for which an error was detected with retransmitted data, without discarding the data. IR is a method of obtaining a coding gain by incrementally transmitting additional redundant information through retransmitted data.

Figure 19:
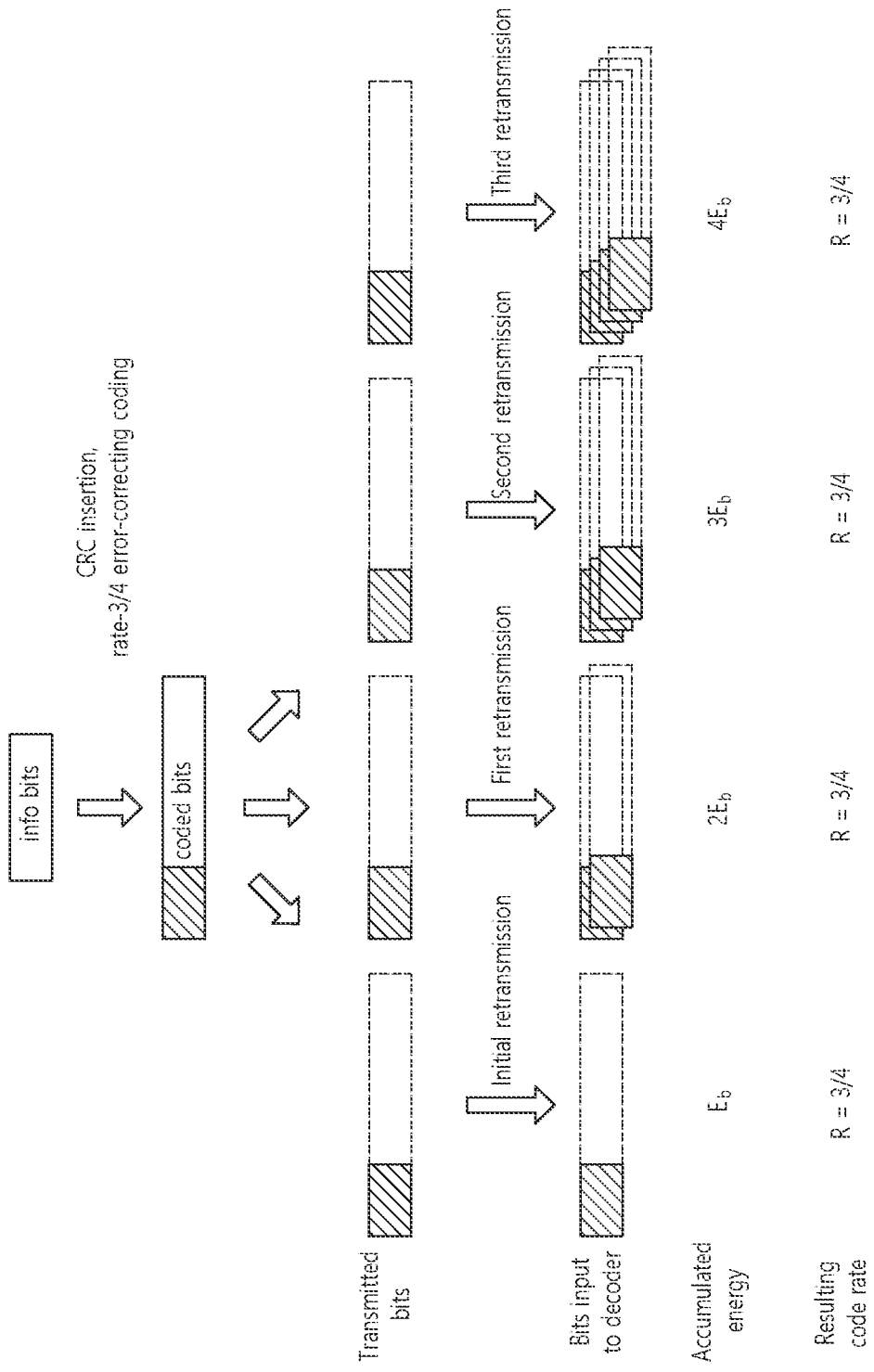
FIG. 19 illustrates an example of chase combining.

FIG. 19 illustrates an example of chase combining. Chase combining is a method in which the same coded bit as in initial transmission is retransmitted.

Figure 20:
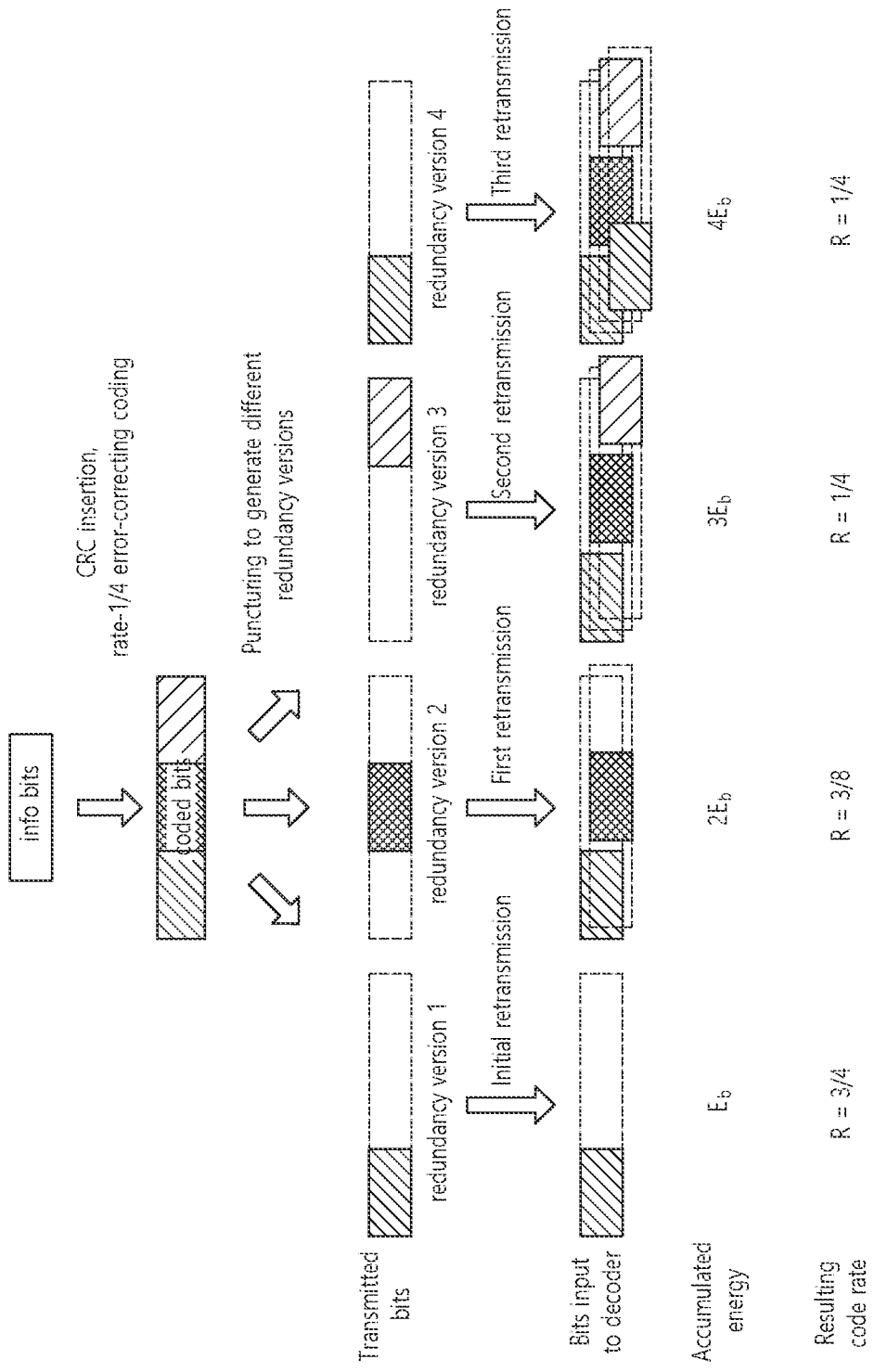
FIG. 20 illustrates an example of an IR method.

FIG. 20 illustrates an example of an IR method. In the IR method, a retransmitted coded bit may be different from that in initial transmission as described below. Accordingly, when the IR method is used, a STA performing retransmission generally transmits an IR version (or packet version/retransmission version) to a receiving STA. The following drawing illustrates an example in which a transmitting STA retransmits IR version 1, IR Version 2, IR Version 3, and IR Version 1 in order. A receiving STA may combine and decode received packets/signals.

HARQ may have an effect of extending coverage in a low SNR environment (e.g., an environment in which a transmitter and a receiver are far apart). HARQ may have an effect of increasing throughput in a high SNR environment.

According to a basic HARQ procedure, a transmitter may transmit packets and a receiver may receive the packets. The receiver may check whether the received packets have an error. The receiver may feed a request to retransmit erroneous packets among the received packets back to the transmitter. For example, the receiver may transmit the request to retransmit the erroneous packets among the received packets through an ACK/NACK frame or a block ACK frame. The transmitter may receive feedback from the receiver and may retransmit the erroneous packets based on the feedback. For example, the transmitter may transmit the erroneous packets along with new packets. Packets having no error may not be retransmitted. The receiver may combine the previously received erroneous packets and the retransmitted packets and may decode the packets. A method for combining packets includes a method of combining in modulation symbol units (e.g., BPSK, QPSK, 16QAM, 64QAM, 256QAM, 1024QAM, and the like) and a method of combining in log likelihood ratio (LLR) units after a de-mapper. The following description is made based on a method of combining in LLR units. When the previously received packets and the retransmitted packets are combined and decoded but an error occurs, the foregoing procedure may be repeated as many times as the preset maximum number of retransmissions.

Figure 21:
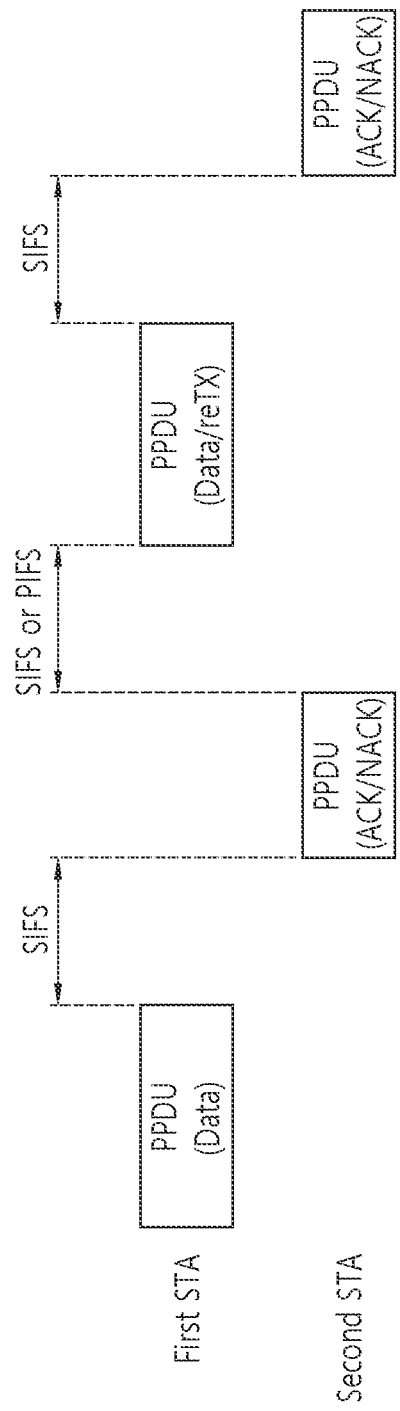
FIG. 21 illustrates an embodiment of an HARQ operation in a WLAN system.

FIG. 21 illustrates an embodiment of an HARQ operation in a WLAN system.

A horizontal axis of FIG. 21 is a time axis. Referring to FIG. 21, a first STA 110 or 120 may transmit a PPDU to a second STA 110 or 120. For example, the first STA 110 or 120 may transmit the PPDU including first data to the second STA 110 or 120, and the second STA 110 or 120 may receive the PPDU including the first data from the first STA 110 or 120.

The second STA 110 or 120 may receive the PPDU from the first STA 110 or 120. The second STA 110 or 120 may decode the received PPDU. The second STA 110 or 120 may check the received PPDU for errors. For example, the second STA 110 or 120 may check the first data included in the PPDU for errors using a frame check sequence (FCS) and/or a cyclic redundancy check (CRC).

When there is an error, the second STA 110 or 120 may transmit a NACK. For example, when there is an error in the first data of the received PPDU, the second STA 110 or 120 may transmit a NACK of the first data to the first STA 110 or 120 after short inter-frame space (SIFS). The first STA 110 or 120 may receive the NACK from the second STA 110 or 120. Upon receiving the NACK, the first STA 110 or 120 may retransmit the first data in which the error has occurred in the second STA 110 or 120 to the second STA 110 or 120. For example, the first STA 110 or 120 may receive the NACK, and may retransmit a PPDU including the first data after SIFS or point coordination function (PCF)) IFS (PIFS). For example, the first STA 110 or 120 may receive the NACK, may perform contention, and may retransmit the PPDU including the first data to the second STA 110 or 120. For example, the PPDU retransmitted by the first STA 110 or 120 may include the first data in which the error has occurred and new second data.

The second STA 110 or 120 may receive the retransmitted PPDU from the first STA 110 or 120. The second STA 110 or 120 may perform decoding and error checking of the first data. The second STA 110 or 120 may transmit an ACK or a NACK to the first STA 110 or 120 Based on the result of decoding and error checking. For example, the retransmission may be repeated as many times as the preset maximum allowable number of transmissions.

In the IR method, different parity bits or different parity bit sets (e.g., information bits and parity bits) may be transmitted in each retransmission. Information including information bits and parity bits may be defined as a redundancy version. There may be a plurality of redundancy versions having different parity bits for the same data.

In retransmission, the first STA 110 or 120 may transmit a redundancy version different from a redundancy version transmitted in initial transmission. For example, the second STA 110 or 120 may combine and decode a previously received redundancy version and a newly received redundancy version. For example, the second STA 110 or 120 may determine whether there is an error in the newly received redundancy version, and may combine and decode the previously received redundancy version and the newly received redundancy version only when there is an error. For example, after checking the newly received redundancy version for errors, the second STA 110 or 120 may transmit data to a MAC layer when there is no error, and may combine and decode the redundancy versions when there is an error. The second STA 110 or 120 may transmit an ACK when the decoding is successful, and may request retransmission by transmitting a NACK when there is an error. Upon receiving the NACK, the transmitting STA 110 or 120 may retransmit a different redundancy version.

When retransmission is performed based on contention rather than after a predetermined time, such as SIFS or PIFS, the receiver and transmitter may have an increase in hardware complexity and cost.

For example, when the transmitter transmits data and receives a NACK of the data, the transmitter may need to perform contention to retransmit the data. The transmitter may need to store the data in an HARQ buffer until receiving an ACK of the data from the receiver. The receiver may need to store an existing redundancy version of the data in the HARQ buffer to use the existing redundancy version of the data for combining.

For example, even though the transmitter obtains a transmission opportunity by performing contention, the transmitter may not retransmit the data of which the NACK is received. When retransmission is not performed, the transmitter and the receiver need to store the existing data (or the redundancy version) in the HARQ buffer. When new data is transmitted between initial transmission and retransmission or between retransmissions, the HARQ buffer may be increasingly used for retransmission and for an HARQ operation for new pieces of data. Therefore, the size of the HARQ buffer may be inevitably increased, and as the size of the HARQ buffer is increased, hardware costs may increase and a management procedure may be complicated.

An example of the present specification described below relates to a technical feature of performing an HARQ operation of a STA 110 and 120 supporting HARQ.

A first STA 110 or 120 may transmit first information related to a maximum HARQ index value supported by the first STA 110 or 120 and second information related to a time limit related to an HARQ index. For example, each of the first information and the second information may be included at least one of a beacon frame, an association request frame, an association response frame, a probe request frame, and a probe response. The first STA 110 or 120 may receive third information related to a maximum HARQ index value supported by the second STA 110 or 120 from the second STA 110 or 120. The first STA 110 or 120 may perform an HARQ operation based on a smaller value of the maximum HARQ index value supported by the first STA 110 or 120 and the maximum HARQ index value supported by the second STA 110 or 120. A maximum HARQ index value may be the number of HARQ indexes that can be included in one physical protocol data unit (PPDU). An HARQ unit may be a data retransmission unit, and one HARQ unit may be allocated to each HARQ index. Alternatively, two or more HARQ units may be allocated to one HARQ index. For example, when an HARQ unit is a codeword rather than an MPDU, a plurality of HARQ units may be allocated to one HARQ index.

A time limit may be allocated to each HARQ unit. When a plurality of HARQ units is allocated to one HARQ index, a time limit value may be set to the largest value among a plurality of time limit values. The time limit may be used for the maximum storage time of an HARQ buffer related to an HARQ index. For example, when the time limit expires, the first STA 110 or 120 may flush the HARQ buffer related to the HARQ index. For example, flushing the HARQ buffer may mean deleting content stored in the HARQ buffer.

The second information may include information related to a time limit related to an HARQ index for each access category. The first STA 110 or 120 may perform association with the second STA 110 or 120 based on the first information and the second information.

Hereinafter, for convenience of description, it is assumed that one HARQ unit is allocated to one HARQ index.

Figure 22:
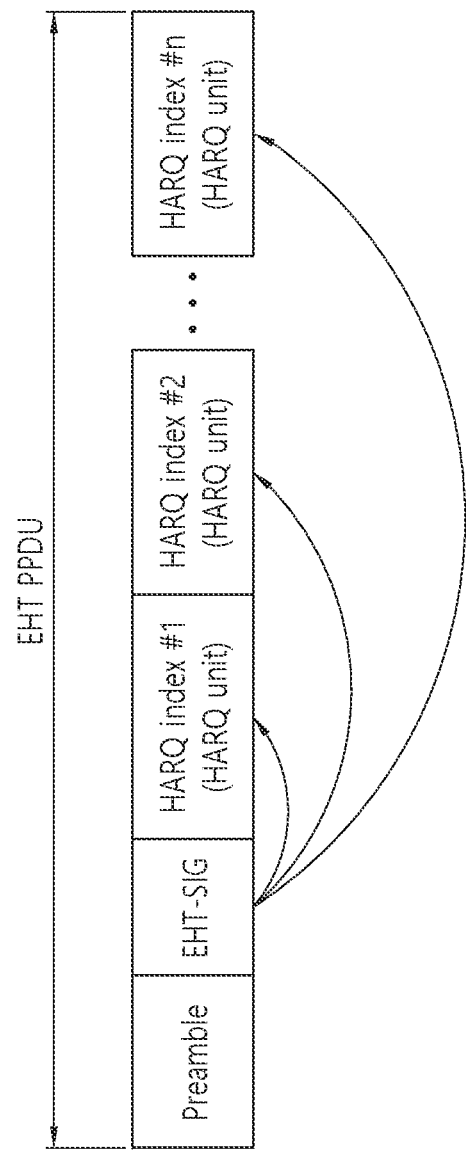
FIG. 22 illustrates an embodiment of a PPDU configuration.

FIG. 22 illustrates an embodiment of a PPDU configuration.

Referring to FIG. 22, an HARQ unit is a unit serving as a criterion for determining the occurrence of an error. That is, it may be determined whether an error occurs for each HARQ unit. The HARQ unit is a unit in which retransmission is performed. For example, the HARQ unit may be an MPDU or a codeword.

For example, a STA 110 and 120 may receive a PPDU including an HARQ unit #1 and an HARQ unit #2. The STA 110 and 120 may determine whether an error occurs in each of the HARQ unit #1 and the HARQ unit #2. When an error occurs in the HARQ unit #1 and no error occurs in the HARQ unit #2, the STA 110 and 120 may transmit a NACK of only the HARQ unit #1. The STA 110 and 120 may receive the retransmitted HARQ unit #1.

As many HARQ units as a preset maximum HARQ index value may be included in one PPDU. An HARQ index may be referred to as an HARQ index number, and an HARQ index is used hereinafter. A transmitting STA 110 or 120 and a receiving STA 110 or 120 may transmit and receive as many HARQ units as a preset maximum HARQ index value. For example, HARQ units may have an HARQ index number (e.g., HARQ index #1, HARQ index #2, HARQ index #n, and the like). For example, one HARQ unit may be allocated to each HARQ index.

The STA 110 and 120 may have HARQ buffers corresponding to the number of HARQ indexes. For example, there may be an HARQ buffer allocated to each HARQ index number (e.g., HARQ index #1, HARQ index #2, HARQ index #n, and the like). An HARQ buffer used when the STA 110 and 120 operate as a transmitting STA 110 or 120 may be different from an HARQ buffer used when the STA 110 and 120 operate as a receiving STA 110 or 120. The transmitting STA 110 or 120 and the receiving STA 110 or 120 may perform an HARQ operation with as many HARQ buffers as the preset number of HARQ indexes. Data transmission, data retransmission, and combining may be performed for each HARQ index number (e.g., HARQ index #1, HARQ index #2, HARQ index #n, and the like).

Control information related to an HARQ index included in the PPDU may be included in a control field. For example, information related to the number of HARQ indexes included in the PPDU and/or the number of HARQ units included in the PPDU may be included in an EHT-SIG field (e.g., a SIG-A field, a SIG-B field, a SIG-C field, and the like). For example, the control information related to the HARQ index may be included in a front part of an HARQ burst using a specific sequence. That is, the control information related to the HARQ index may be transmitted through the specific sequence before HARQ units are transmitted. For example, the control information related to the HARQ index may include configuration information related to each HARQ index.

A maximum HARQ index value supported by the STA 110 and 120 (e.g., an AP or a non-AP STA 110 and 120) (i.e., the maximum number of HARQ indexes that the STA 110 and 120 can support) may be set as a system parameter. A maximum HARQ index value supported by the STA 110 and 120 where the STA 110 and 120 operate as the transmitting STA 110 or 120 may be different from that where the STA 110 and 120 operate as the receiving STA 110 or 120.

Before transmitting data between the transmitting STA 110 or 120 and the receiving STA 110 or 120, the number of HARQ indexes to be used between the transmitting STA 110 or 120 and the receiving STA 110 or 120 may need to be determined. The transmitting STA 110 or 120 and the receiving STA 110 or 120 may perform data transmission/reception based on the preset number of HARQ indexes. The transmitting STA 110 or 120 and the receiving STA 110 or 120 may determine an HARQ buffer size used for an HARQ operation based on the number of HARQ indexes.

For example, the maximum HARQ index value may be a natural number of 2 or greater. The maximum HARQ index value may be used by any STA 110 and 120 as the system parameter.

Figure 23:
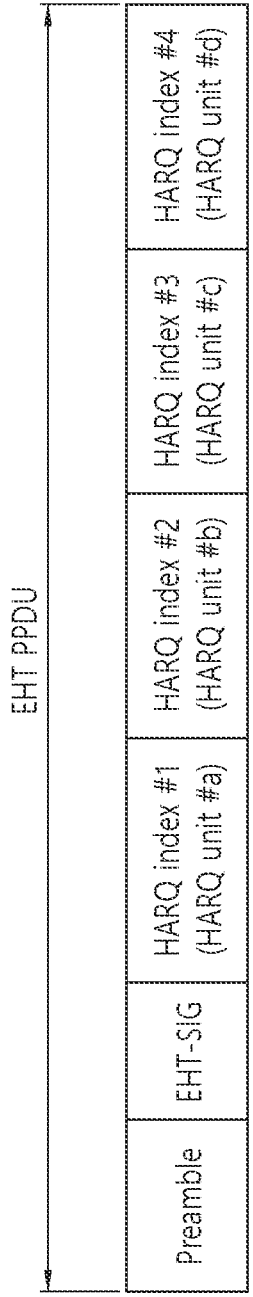
FIG. 23 and FIG. 24 illustrate an embodiment of a PPDU configuration.
Figure 24:
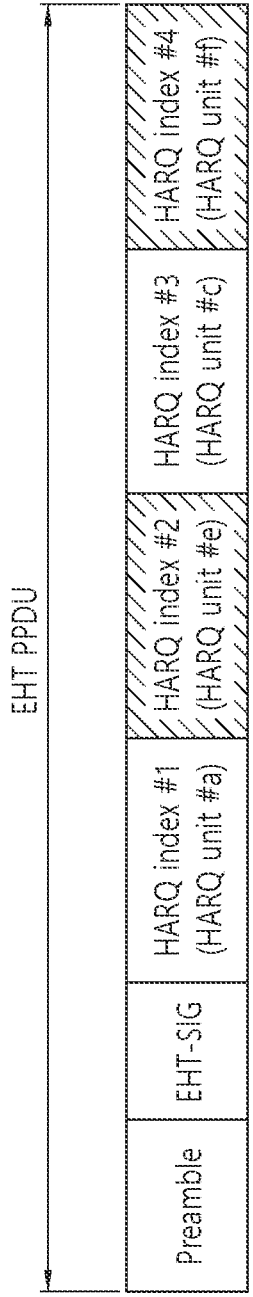

FIG. 23 and FIG. 24 illustrate an embodiment of a PPDU configuration.

FIG. 23 and FIG. 24 illustrate examples of a PPDU in which the number of HARQ indexes is set to 4. One HARQ unit may be allocated to each HARQ index. For example, as illustrated in FIG. 23, an HARQ unit #a may be allocated to HARQ index #1, an HARQ unit #b may be allocated to an HARQ index #2, an HARQ unit #c may be allocated to an HARQ index #3, and an HARQ unit #d may be allocated to an HARQ index #4.

A transmitting STA 110 or 120 may transmit a PPDU of FIG. 23 to a receiving STA 110 or 120. The receiving STA 110 or 120 may receive the PPDU of FIG. 23 and may check the received PPDU for errors. For example, when there is an error in the HARQ unit #a and the HARQ unit #c, the receiving STA 110 or 120 may transmit NACKs of the HARQ indexes #1 and #3 (or the receiving STA 110, 120 may request retransmission of HARQ indexes #1 and #3) and may transmit ACKs of the HARQ indexes #2 and #4.

When receiving the NACKs of the HARQ indexes #1 and #3, the transmitting STA 110 or 120 may retransmit the HARQ unit #a and the HARQ unit #c allocated to the HARQ index #1 and the HARQ index #3. When receiving the ACKs of the HARQ indexes #2 and #4, the transmitting STA 110 or 120 may allocate new HARQ units to the HARQ indexes #2 and #4. For example, an HARQ unit #e may be allocated to the HARQ index #2, and an HARQ unit #f may be allocated to the HARQ index #4. That is, the transmitting STA 110 or 120 may transmit a PPDU of FIG. 24 to the receiving STA 110 or 120. The HARQ units #e and #f may be new data not included in the previous PPDU (e.g., the PPDU of FIG. 23).

There may be an operation of negotiating the number of HARQ indexes between the STAs 110 and 120 to determine the number of HARQ indexes included in the PPDU. Hereinafter, a method of negotiating the number of HARQ indexes between the STAs 110 and 120 will be described.

Figure 25:
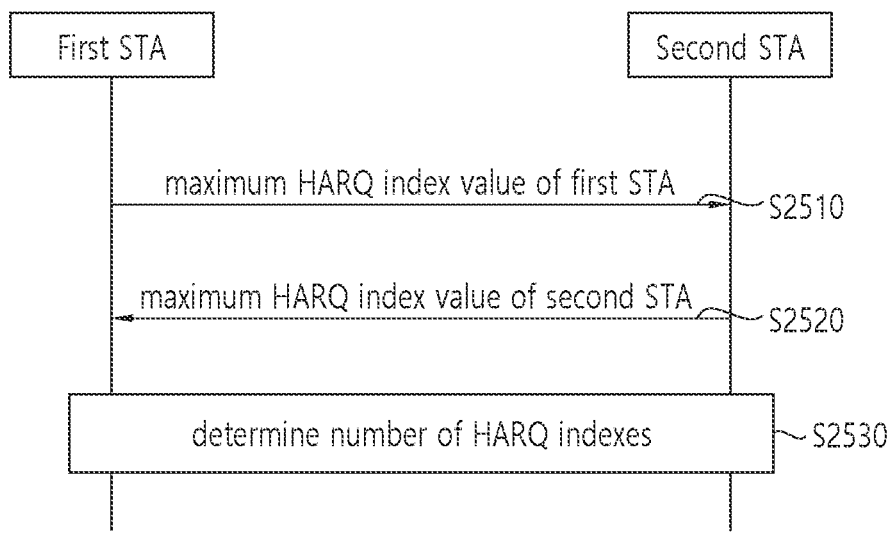
FIG. 25 illustrates an example of an association operation between STAs 110 and 120.

FIG. 25 illustrates an example of an association operation between STAs 110 and 120.

Referring to FIG. 25, a first STA 110 or 120 may transmit information related to a maximum HARQ index value that the first STA 110 or 120 can support to a second STA 110 or 120 (S2510). The maximum HARQ index value that the first STA 110 or 120 can support may be determined based on a hardware capability and/or an HARQ buffer size of the first STA 110 or 120. The second STA 110 or 120 may receive the information related to the maximum HARQ index value that the first STA 110 or 120 can support from the first STA 110 or 120.

The information related to the maximum HARQ index value may be included in, for example, a beacon frame, an association request frame, an association response frame, a probe request frame, a probe response frame, and the like.

The second STA 110 or 120 may transmit information related to a maximum HARQ index value that the second STA 110 or 120 can support to the first STA 110 or 120 (S2520). The first STA 110 or 120 may receive the information related to the maximum HARQ index value that the second STA 110 or 120 can support from the second STA 110 or 120.

The first STA 110 or 120 may determine the number of HARQ indexes to be used for communication with the second STA 110 or 120 based on the information related to the maximum HARQ index value that the first STA 110 or 120 can support and the information related to the maximum HARQ index value that the second STA 110 or 120 can support (S2530). For example, according to an implicit method, the first STA 110 or 120 may set a smaller value of the maximum HARQ index values that the first STA 110 or 120 and the second STA 110 or 120 can support as the number of HARQ indexes to be used for the communication with the second STA 110 or 120, and the second STA 110 or 120 may also set the smaller value of the maximum HARQ index values that the first STA 110 or 120 and the second STA 110 or 120 can support as the number of HARQ indexes to be used for communication with the first STA 110 or 120. For example, according to an explicit method, the first STA 110 or 120 may set the smaller value of the maximum HARQ index values that the first STA 110 or 120 and the second STA 110 or 120 can support as the number of HARQ indexes to be used for the communication with the second STA 110 or 120 and may transmit information related to the set number of HARQ indexes to the second STA 110 or 120.

The number of HARQ indexes to be used for communication between the first STA 110 or 120 and the second STA 110 or 120 may be differently set in an uplink and a downlink. The first STA 110 or 120 may transmit both information related to a maximum HARQ index value that the first STA 110 or 120 can support in transmission and information related to a maximum HARQ index value that the first STA 110 or 120 can support in reception in S2510. The second STA 110 or 120 may transmit information related to a maximum HARQ index value that the second STA 110 or 120 can support in transmission and information related to a maximum HARQ index value that the second STA 110 or 120 can support in reception in S2520.

For example, the number of HARQ indexes included in a PPDU transmitted by the first STA 110 or 120 to the second STA 110 or 120 may be different from the number of HARQ indexes included in a PPDU received by the first STA 110 or 120 from the second STA 110 or 120. Since a transmission buffer (Tx buffer) and a reception buffer (Rx buffer) of each STA 110 and 120 may have different sizes, the number of HARQ indexes may be determined separately for the uplink and the downlink. For example, since downlink traffic load is greater than uplink traffic load, an AP may have a larger Tx buffer than a Rx buffer. For example, a smaller value of a maximum HARQ index value supported by a Tx buffer of the first STA 110 or 120 and a maximum HARQ index value supported by a Rx buffer of the second STA 110 or 120 may be set as the number of indexes included in the PPDU transmitted by the first STA 110 or 120 to the second STA 110 or 120, and a smaller value of a maximum HARQ index value supported by a Tx buffer of the second STA 110 or 120 and a maximum HARQ index value supported by a Rx buffer of the first STA 110 or 120 may be set as the number of indexes included in the PPDU received by the first STA 110 or 120 from the second STA 110 or 120. For example, when the maximum HARQ index value based on the Tx buffer of the first STA 110 or 120 is 10, the maximum HARQ index value based on the Rx buffer of the first STA 110 or 120 is 4, the maximum HARQ index value based on the Rx buffer of the second STA 110 or 120 is 2, and the maximum HARQ index value based on the Tx buffer of the second STA 110 or 120 is 5, the first STA 110 or 120 may transmit a PPDU including two HARQ indexes and may receive a PPDU including four HARQ indexes.

When an HARQ operation based on an HARQ index is performed, a maximum allowable temporal limit for data to be retransmitted may be required. Hereinafter, an operation related to a time limit for storing data to be retransmitted in an HARQ buffer will be described.

When data retransmission is not performed within a short time, a new HARQ unit may not be allocated to an HARQ index, and a transmitting STA 110 or 120 and a receiving STA 110 or 120 need to continue to store corresponding data in an HARQ buffer. For example, the receiving STA 110 or 120 receives an HARQ unit #a allocated to an HARQ index #1 but may fail to decode the HARQ unit #a. The receiving STA 110 or 120 may store the received HARQ unit #a in the HARQ buffer. The receiving STA 110 or 120 may transmit a NACK of the HARQ index #1. The receiving STA 110 or 120 needs to store the HARQ unit #a in the HARQ buffer until obtaining a different redundancy version of the HARQ unit #a from the transmitting STA 110 or 120 and cannot receive a different HARQ unit through the HARQ index #1.

Accordingly, a method of flushing an HARQ buffer related to an HARQ index when a time limit expires is proposed. A time limit may be individually set according to a HARQ index number. For example, a time limit of 3 ms may be set for an HARQ index #1, and a time limit of 4 ms may be set for an HARQ index #2. For example, a time limit may be commonly applied to all HARQ indexes, and only a counter may be individually calculated for each HARQ index.

For example, a time limit may be defined as an absolute time. For example, a time limit may be defined as a multiple of slot duration or may be defined as a multiple of an arbitrary time interval. For example, a time limit may be defined as a parameter for the maximum number of retransmissions rather than a time. When retransmission is performed as many times as the maximum number of retransmissions but decoding fails, the transmitting STA 110 or 120 and the receiving STA 110 or 120 may flush an HARQ buffer for corresponding data. After the HARQ buffer is flushed, a new HARQ unit may be allocated to an HARQ index.

The time limit may be set to a different value according to an operating frequency band (e.g., 2.4 GHz, 5 GHz, 6 GHz, and the like). In a 2.4 GHz band in which a large number of legacy STAs 110 and 120 are distributed, a relatively short time limit may be set, and the channel occupancy frequency of EHT STAs 110 and 120 may be reduced.

A time limit may be adaptively changed. For example, a time limit value may be changed based on a channel occupancy environment even within one frequency band. For example, when it is difficult to occupy a channel for retransmission because a plurality of STAs 110 and 120 exists in one BSS, a time limit value may be changed. For example, an AP may report a changed time limit value (or the maximum allowed number of retransmissions) through a beacon frame, an association request frame, an association response frame, a probe request frame, a probe response frame, and the like, and a STA 110 and 120 may confirm the changed time limit value through a response frame. For example, the STA 110 and 120 may first request the AP to change a time limit value.

A time limit may be separately set for the uplink and the downlink. For example, when a first STA 110 or 120 performs communication with a second STA 110 or 120, a time limit value for a TX PPDU (or an HARQ index included in the TX PPDU) may be different from a time limit value for a RX PPDU (or an HARQ index included in the RX PPDU).

The starting point of a counter serving as a criterion for determining whether a time limit expires may be defined as follows.

The transmitting STA 110 or 120 may calculate a counter based on a PPDU transmitted by the transmitting STA 110 or 120, and the receiving STA 110 or 120 may calculate a counter based on a PPDU received by the receiving STA 110 or 120. A counter is a parameter that records how much time has elapsed from a starting point.

For example, the starting point of a counter for each HARQ index may be the start of an L-STF of a PPDU including initial transmission data of the HARQ index. That is, the counter may increase from the starting point of the L-STF of the PPDU. For example, the starting point of the counter for each HARQ index may be the end of the PPDU including the initial transmission data of the HARQ index. That is, the counter may increase from the end of the PPDU. The initial transmission data refers to initially transmitted data rather than retransmitted data. Information related to whether data is initially transmitted may be included in a control field (e.g., an EHT-SIG field). For example, one bit indicating whether data is initially transmitted may be included in the EHT-SIG field.

The transmitting STA 110 or 120 may flush an HARQ transmission buffer related to a corresponding HARQ index when the counter exceeds a time limit. The receiving STA 110 or 120 may flush an HARQ reception buffer related to a corresponding HARQ index when the counter exceeds a time limit.

For example, the starting point of the counter for each HARQ index may be based on a PPDU first retransmitted. That is, the counter for the HARQ index may be calculated based on a PPDU including a first retransmitted HARQ index. For example, the starting point of the counter for each HARQ index may be the start of an L-STF of a PPDU including first retransmitted data of the HARQ index. For example, the starting point of the counter for each HARQ index may be the end of the PPDU including the first retransmitted data of the HARQ index. When the starting point of a counter for an HARQ index is set based on a PPDU including a retransmitted HARQ index, at least one retransmission may be guaranteed.

Figure 26:
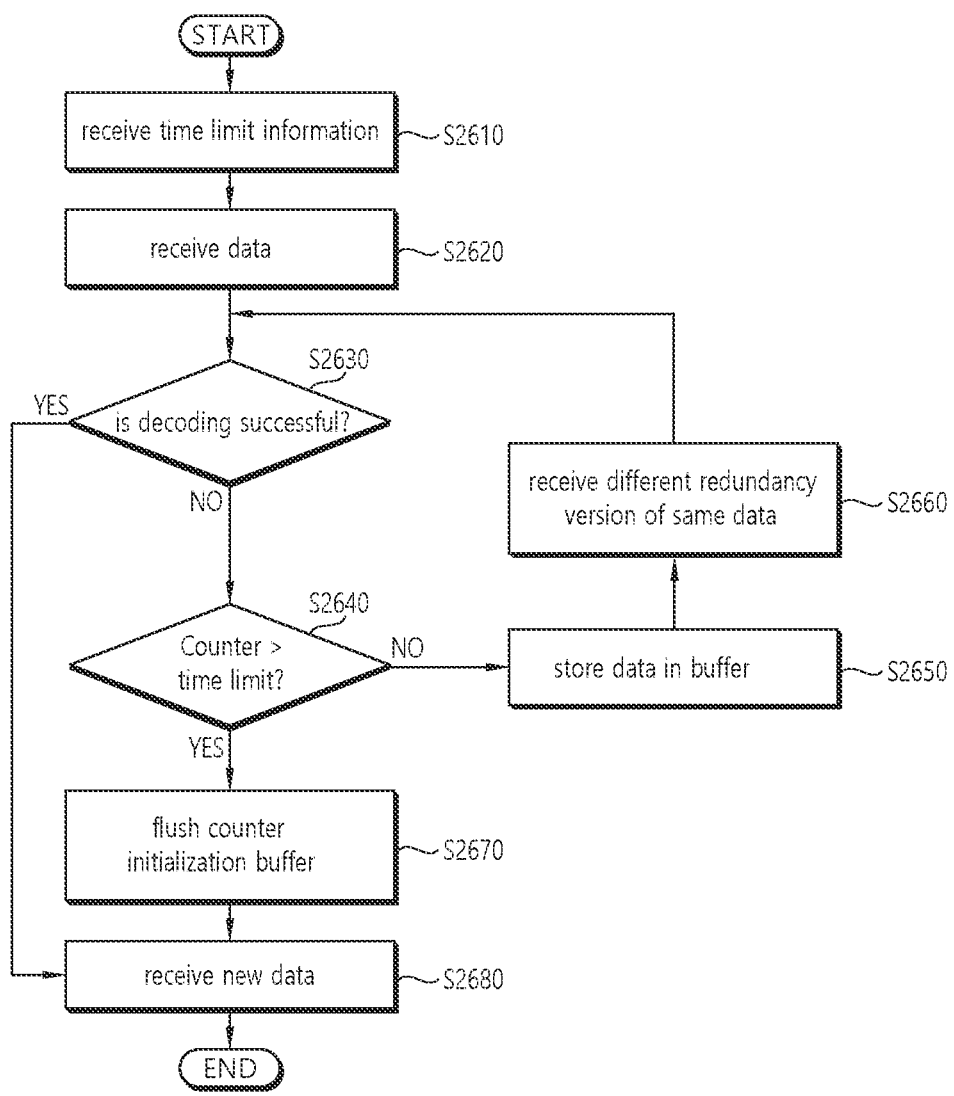
FIG. 26 is a flowchart illustrating an embodiment of a method for a STA 110 and 120 to decode received data.

FIG. 26 is a flowchart illustrating an embodiment of a method for a STA 110 and 120 to decode received data.

FIG. 26 is a flowchart illustrating the operation of a receiving STA 110 or 120. FIG. 26 illustrates a process in which the receiving STA 110 or 120 decodes data received through one HARQ index based on the HARQ index.

The receiving STA 110 or 120 may receive time limit information from a transmitting STA 110 or 120 (S2610). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The receiving STA 110 or 120 may receive data (or a PPDU including data) from the transmitting STA 110 or 120 (S2620). The data may be one redundancy version for which a hybrid automatic repeat request-incremental redundancy (HARQ-IR) operation is performed.

The receiving STA 110 or 120 may decode the received data (S2630). When successfully decoding the received data, the receiving STA 110 or 120 may receive new data through the HARQ index (S2680). That is, a new HARQ unit may be allocated to the HARQ index.

When failing to decode the received data, the receiving STA 110 or 120 may compare a counter for the HARQ index with a time limit value for the HARQ index (S2640). The receiving STA 110 or 120 may obtain the time limit value for the HARQ index in S2610.

When the counter for the HARQ index is greater than the time limit value for the HARQ index, the receiving STA 110 or 120 may initialize the counter for the HARQ index and may flush a buffer for the HARQ index (S2670). Subsequently, the receiving STA 110 or 120 may receive new data through the HARQ index (S2680).

When the counter for the HARQ index is less than the time limit value for the HARQ index, the receiving STA 110 or 120 may store the data in the buffer (S2650). For example, the receiving STA 110 or 120 may store the data (e.g., a first redundancy version of the data) in an HARQ Rx buffer. The receiving STA 110 or 120 may receive a different redundancy version of the same data (e.g., a second redundancy version of the data) (S2660).

The receiving STA 110 or 120 may combine and decode the data stored in the buffer (e.g., the first redundancy version of the data) and the newly received data (e.g., the second redundancy version of the data). The subsequent procedure may proceed again from S2630. Some of the specific operations illustrated in the embodiment of FIG. 26 may be omitted, and other operations may be added.

Figure 27:
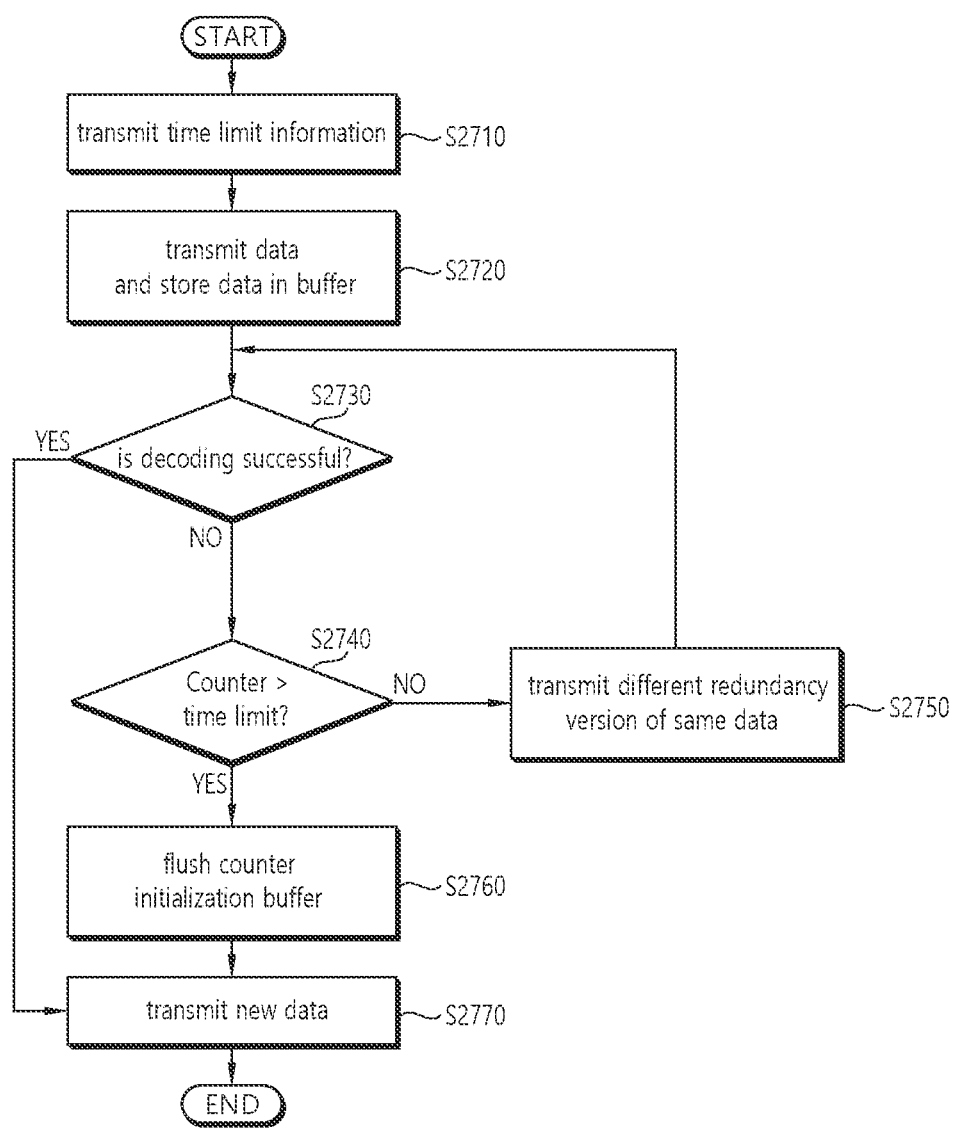
FIG. 27 is a flowchart illustrating an embodiment of a method for a STA 110 and 120 to transmit data.

FIG. 27 is a flowchart illustrating an embodiment of a method for a STA 110 and 120 to transmit data.

FIG. 27 is a flowchart illustrating the operation of a transmitting STA 110 or 120. FIG. 27 illustrates a process in which the transmitting STA 110 or 120 transmits data through one HARQ index based on the HARQ index.

The transmitting STA 110 or 120 may transmit time limit information to a receiving STA 110 or 120 (S2710). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The transmitting STA 110 or 120 may transmit data (or a PPDU including data) to the receiving STA 110 or 120 and may store the transmitted data in a buffer (S2720). The data may be a first redundancy version for which an HARQ-IR operation is performed.

The transmitting STA 110 or 120 may receive an ACK or NACK of the data from the receiving STA 110 or 120. The transmitting STA 110 or 120 may identify whether decoding is successful in the receiving STA 110 or 120 based on the ACK or NACK received from the receiving STA 110 or 120 (S2730). When the transmitting STA 110 or 120 receive the ACK from the receiving STA 110 or 120, the transmitting STA 110 or 120 may determine that the decoding is successful. When the decoding is successful in the receiving STA 110 or 120, the transmitting STA 110 or 120 may transmit new data through the HARQ index (S2770). That is, a new HARQ unit may be allocated to the HARQ index.

When the transmitting STA 110 or 120 receive the NACK from the receiving STA 110 or 120, the transmitting STA 110 or 120 may determine that the decoding has failed in the receiving STA 110 or 120. When the decoding fails in the receiving STA 110 or 120, the transmitting STA 110 or 120 may compare a counter for the HARQ index with a time limit value for the HARQ index (S2740). The time limit value for the HARQ index may be the time limit value transmitted in S2710.

When the counter for the HARQ index is greater than the time limit value for the HARQ index, the transmitting STA 110 or 120 may initialize the counter for the HARQ index and may flush a buffer for the HARQ index (S2760). Subsequently, the transmitting STA 110 or 120 may transmit new data through the HARQ index (S2770).

When the counter for the HARQ index is less than the time limit value for the HARQ index, the transmitting STA 110 or 120 may transmit a different redundancy version of the same data (e.g., a second redundancy version of the data) (S2750). The subsequent procedure may proceed again from S2730.

A time limit may be set differently according to the type of traffic. Hereinafter, setting a time limit according to an access category will be described.

Some of the specific operations illustrated in the embodiment of FIG. 27 may be omitted, and other operations may be added.

Table 5 illustrates an example of setting a time limit (or the maximum number of retransmissions) according to an access category.

TABLE 5

| AC | Option 1<br>Retransmission time limit<br>(absolute value) | Option 2<br>Retransmission time limit<br>(maximum retransmission number) |
|---|---|---|
| AC_BK | 3.264 ms | 4 |
| AC_BE | 3.264 ms | 4 |
| AC_VI | 6.016 ms | 8 |
| AC_VO | 3.264 ms | 2 |

A time limit (or the maximum number of retransmissions) may be separately set for each access category (e.g., AC_BK, AC_BE, AC_VI, AC_VO, and the like). For example, a short time limit may be set for delay-sensitive traffic. For example, since it is meaningless to retransmit a voice (e.g., VoIP) after a certain time, a short time limit may be set for the voice. The same time limit or different time limits may be set for AC_BK, AC_BE, AC_VI, and AC_VO, and specific time limit values are not limited to Table 5.

Referring to Table 5, a time limit of 3.264 ms may be set for AC_BK. That is, a buffer related to an HARQ index to which data corresponding to an access category of AC_BK is allocated may be flushed after 3.264 ms. Alternatively, the buffer related to the HARQ index to which the data corresponding to the access category of AC_BK is allocated may be flushed when decoding fails even after four retransmissions are performed. A time limit of 3.264 ms may be set for AC_BE. That is, a buffer related to an HARQ index to which data corresponding to an access category of AC_BE is allocated may be flushed after 3.264 ms. Alternatively, the buffer related to the HARQ index to which the data corresponding to the access category of AC_BE is allocated may be flushed when decoding fails even after four retransmissions are performed. A time limit of 6.016 ms may be set for AC_VI. That is, a buffer related to an HARQ index to which data corresponding to an access category of AC_VI is allocated may be flushed after 6.016 ms. Alternatively, the buffer related to the HARQ index to which the data corresponding to the access category of AC_VI is allocated may be flushed when decoding fails even after eight retransmissions are performed. A time limit of 3.264 ms may be set for AC_VO. That is, a buffer related to an HARQ index to which data corresponding to an access category of AC_VO is allocated may be flushed after 3.264 ms. Alternatively, the buffer related to the HARQ index to which the data corresponding to the access category of AC_VO is allocated may be flushed when decoding fails even after two retransmissions are performed.

Two or more HARQ units may be allocated to one HARQ index. For example, when an HARQ unit is a codeword rather than an MPDU, a plurality of HARQ units may be allocated to one HARQ index. When a plurality of HARQ units is allocated to one HARQ index, a plurality of access categories may exist in one HARQ index. Since an HARQ buffer may be allocated in HARQ indexes and a time limit may be allocated in access categories (i.e., HARQ units), a plurality of time limits may be set for one HARQ index. Accordingly, when a plurality of HARQ units is allocated to one HARQ index, a time limit value may be set to the largest value among a plurality of time limit values.

Information related to a time limit may be included in, for example, a control field (e.g., an EHT-SIG field) of a TX PPDU (e.g., a PPDU including data). For example, information related to a time limit may be included in a signal separately transmitted for an HARQ operation. For example, one PPDU may include only one access category, and one PPDU may include only information related to one time limit.

Figure 28:
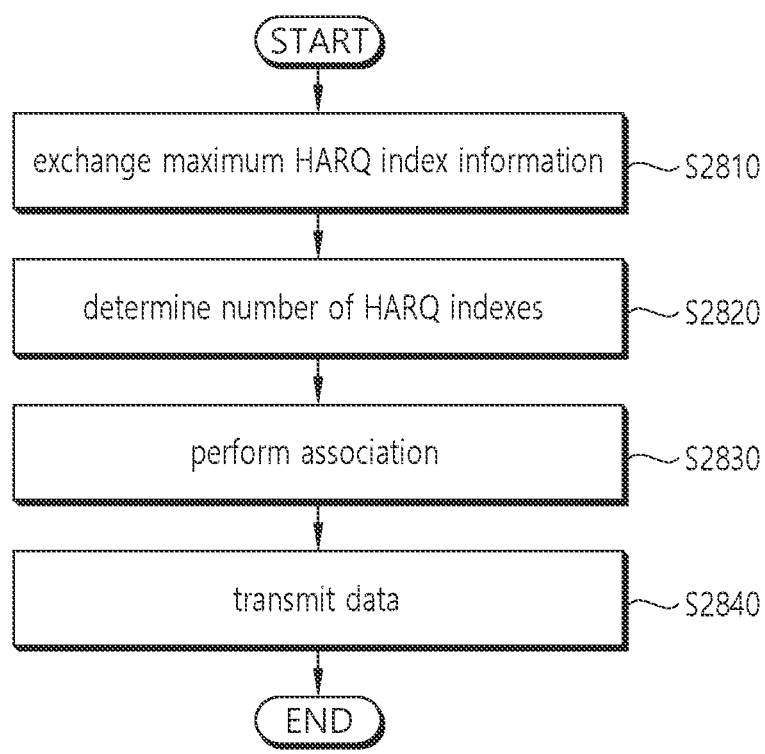
FIG. 28 to FIG. 30 are flowcharts illustrating embodiments of the operation of a transmitting STA 110 or 120.

FIG. 28 is a flowchart illustrating an embodiment of the operation of a transmitting STA 110 or 120.

Referring to FIG. 28, the transmitting STA 110 or 120 may exchange maximum HARQ index information with a receiving STA 110 or 120 (S2810). For example, as illustrated in FIG. 25, the transmitting STA 110 or 120 may transmit information related to a maximum HARQ index value of the transmitting STA 110 or 120 to the receiving STA 110 or 120 and may receive information related to a maximum HARQ index value of the receiving STA 110 or 120 from the receiving STAs 110 and 120. For example, the pieces of information related to the maximum HARQ index value may respectively include information on a maximum HARQ index value supported by the transmitting STA 110 or 120 in transmission and information on a maximum HARQ index value supported by the receiving STA 110 or 120 in reception. The information related to the maximum HARQ index value may be included in, for example, a beacon frame, an association request frame, an association response frame, a probe request frame, a probe response frame, and the like.

The transmitting STA 110 or 120 may determine the number of HARQ indexes based on the maximum HARQ index value supported by the transmitting STA 110 or 120 and the maximum HARQ index value supported by the receiving STA 110 or 120 (S2820). For example, according to an implicit method, the transmitting STA 110 or 120 may set a smaller value of the maximum HARQ index values that the transmitting STA 110 or 120 and the receiving STA 110 or 120 can support as the number of HARQ indexes to be used for communication with the receiving STA 110 or 120, and the receiving STA 110 or 120 may also set the smaller value of the maximum HARQ index values that the transmitting STA 110 or 120 and the receiving STA 110 or 120 can support as the number of HARQ indexes to be used for communication with the transmitting STA 110 or 120. For example, according to an explicit method, the transmitting STA 110 or 120 may set the smaller value of the maximum HARQ index values that the transmitting STA 110 or 120 and the receiving STA 110 or 120 can support as the number of HARQ indexes to be used for the communication with the receiving STA 110 or 120 and may transmit information related to the set number of HARQ indexes to the receiving STA 110 or 120.

The transmitting STA 110 or 120 may perform association with the receiving STA 110 or 120 (S2830). For example, the transmitting STA 110 or 120 may perform connection with the receiving STA 110 or 120 based on the determined number of HARQ indexes.

The transmitting STA 110 or 120 may transmit data to the receiving STA 110 or 120 based on the number of HARQ indexes (S2840). The data transmitted by the transmitting STA 110 or 120 in S2840 may be included in a TX PPDU, and an example of the TX PPDU may be as illustrated in FIG. 18. For example, a TX signal (e.g., the TX PPDU) related to S2840 may include identification information on the receiving STA 110 or 120. For example, the identification information on the receiving STA 110 or 120 may be all or some bits of an AID of the receiving STA 110 or 120, all or some bits of an MAC ID thereof, and the like. The transmitting STA 110 or 120 may insert the identification information on the receiving STA 110 or 120 into the TX signal by various methods. For example, the identification information on the receiving STA 110 or 120 may be inserted into an information bit of a signal field (e.g., a SIG-A, a SIG-B, and the like) of FIG. 18. That is, the information bit of the signal field (e.g., the SIG-A, the SIG-B, and the like) of FIG. 18 may include a subfield related to the identification information on the receiving STA 110 or 120. Alternatively, all or part (e.g., a CRC bit) of the information bit of the signal field (e.g., the SIG-A, the SIG-B, and the like) of FIG. 18 may be scrambled with the identification information on the receiving STA 110 or 120. For example, all/part of the signal field may be scrambled with the identification information on the receiving STA 110 or 120 based on an XOR operation or the like.

Figure 29:
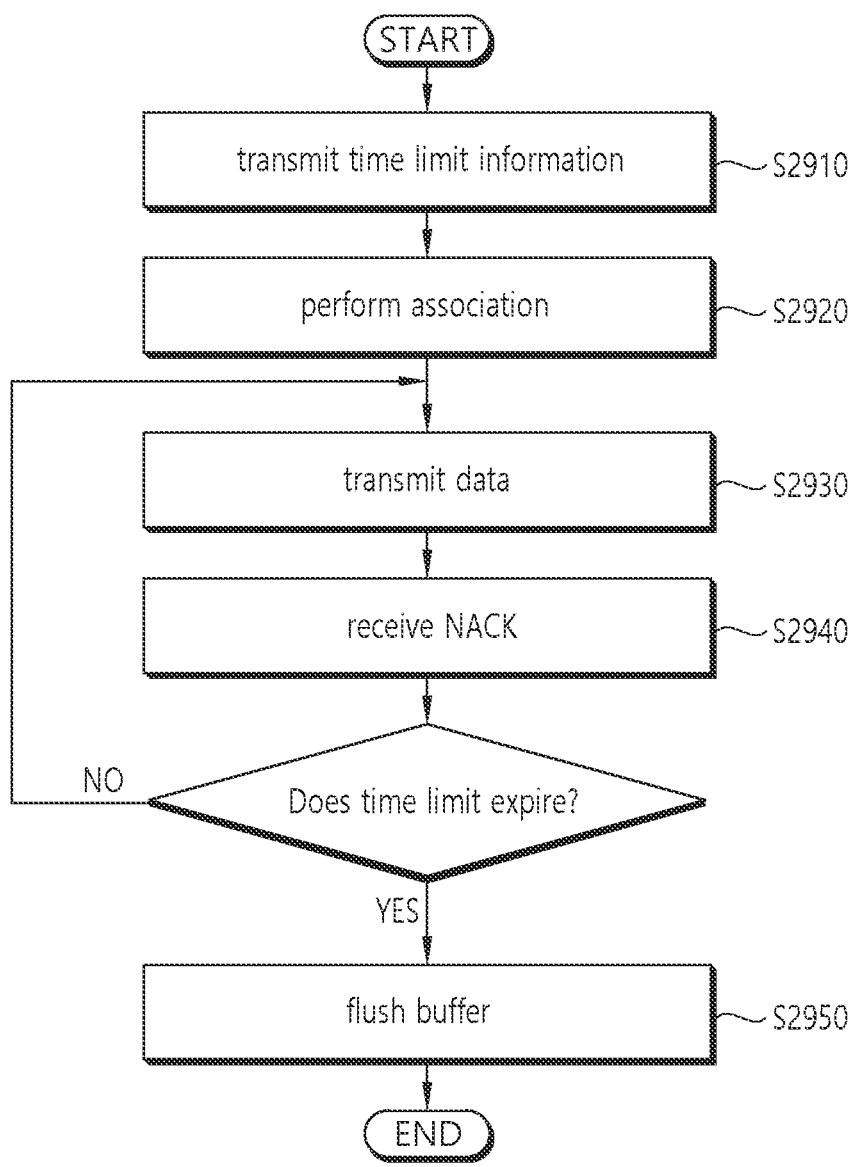

FIG. 29 is a flowchart illustrating an embodiment of the operation of a transmitting STA 110 or 120.

Referring to FIG. 29, the transmitting STA 110 or 120 may transmit information related to a time limit to a receiving STA 110 or 120 (S2910). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The transmitting STA 110 or 120 may perform association with the receiving STA 110 or 120 (S2920). For example, the transmitting STA 110 or 120 may perform connection with the receiving STA 110 or 120 based on the information related to the time limit.

The transmitting STA 110 or 120 may transmit data (or a PPDU including data) to the receiving STA 110 or 120 (S2930). The transmitting STA 110 or 120 may store data in a buffer before or after transmitting the data. The data transmitted by the transmitting STA 110 or 120 in S2930 may be included in a TX PPDU, and an example of the TX PPDU may be as illustrated in FIG. 18. For example, a TX signal (e.g., the TX PPDU) related to S2930 may include identification information on the receiving STA 110 or 120. For example, the identification information on the receiving STA 110 or 120 may be all or some bits of an AID of the receiving STA 110 or 120, all or some bits of an MAC ID thereof, and the like. The transmitting STA 110 or 120 may insert the identification information on the receiving STA 110 or 120 into the TX signal by various methods. For example, the identification information on the receiving STA 110 or 120 may be inserted into an information bit of a signal field (e.g., a SIG-A, a SIG-B, and the like) of FIG. 18. That is, the information bit of the signal field (e.g., the SIG-A, the SIG-B, and the like) of FIG. 18 may include a subfield related to the identification information on the receiving STA 110 or 120. Alternatively, all or part (e.g., a CRC bit) of the information bit of the signal field (e.g., the SIG-A, the SIG-B, and the like) of FIG. 18 may be scrambled with the identification information on the receiving STA 110 or 120. For example, all/part of the signal field may be scrambled with the identification information on the receiving STA 110 or 120 based on an XOR operation or the like.

The transmitting STA 110 or 120 may receive a NACK from the receiving STA 110 or 120 (S2940). Upon receiving the NACK, the transmitting STA 110 or 120 may identify that the receiving STA 110 or 120 has failed to decode the data. When the time limit for the data expires, the transmitting STA 110 or 120 may flush the buffer (S2950). When the time limit for the data does not expire, the transmitting STA 110 or 120 may retransmit the data. For example, when the time limit for the data does not expire, the transmitting STA 110 or 120 may transmit a different redundancy version of the data to the receiving STA 110 or 120.

Figure 30:
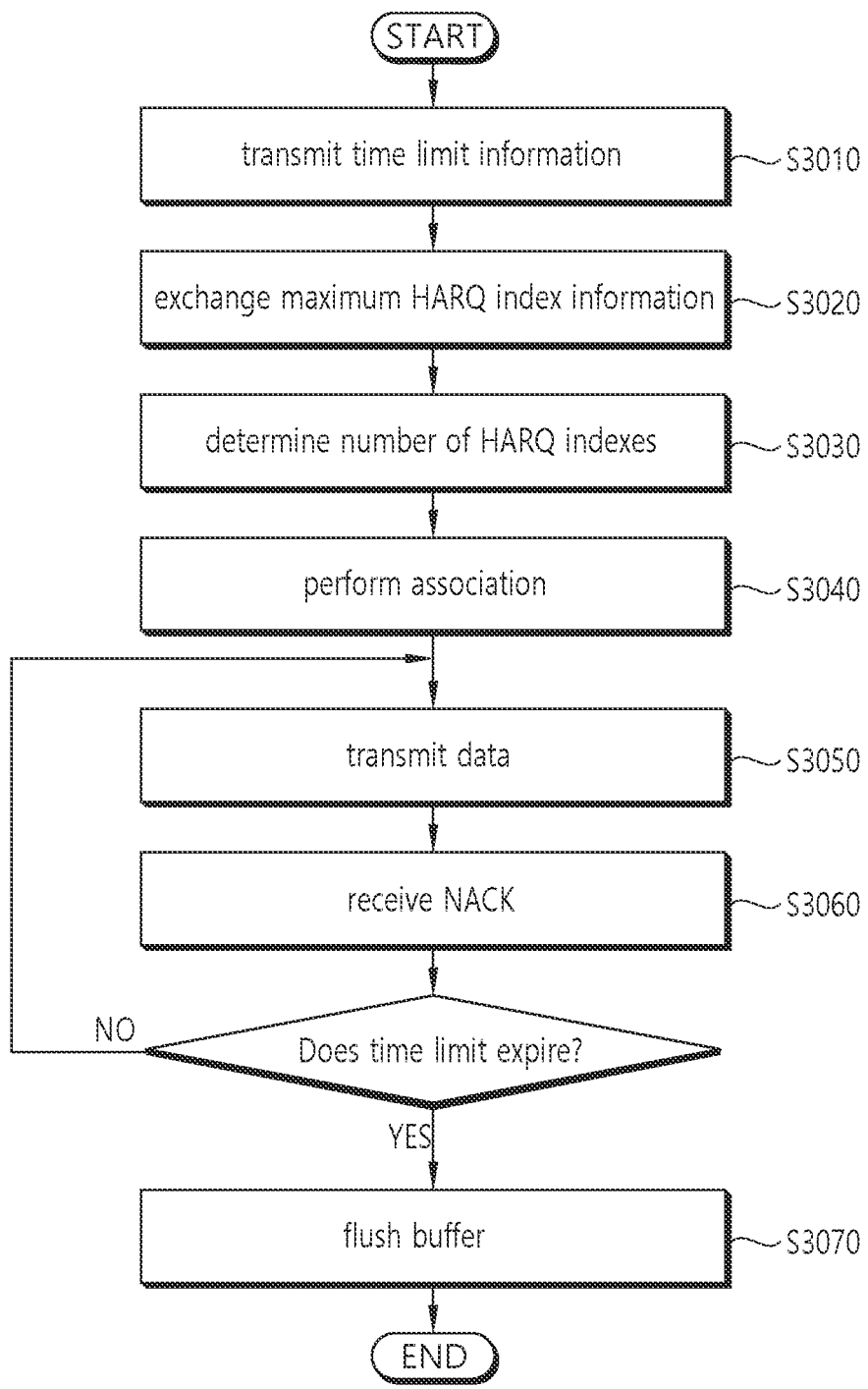

FIG. 30 is a flowchart illustrating an embodiment of the operation of a transmitting STA 110 or 120.

Referring to FIG. 30, the transmitting STA 110 or 120 may transmit information related to a time limit to a receiving STA 110 or 120 (S3010). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The transmitting STA 110 or 120 may exchange maximum HARQ index information with a receiving STA 110 or 120 (S3020). For example, as illustrated in FIG. 25, the transmitting STA 110 or 120 may transmit information related to a maximum HARQ index value of the transmitting STA 110 or 120 to the receiving STA 110 or 120 and may receive information related to a maximum HARQ index value of the receiving STA 110 or 120 from the receiving STAs 110 and 120. For example, the pieces of information related to the maximum HARQ index value may respectively include information on a maximum HARQ index value supported by the transmitting STA 110 or 120 in transmission and information on a maximum HARQ index value supported by the receiving STA 110 or 120 in reception. The information related to the maximum HARQ index value may be included in, for example, a beacon frame, an association request frame, an association response frame, a probe request frame, a probe response frame, and the like.

The transmitting STA 110 or 120 may determine the number of HARQ indexes based on the maximum HARQ index value supported by the transmitting STA 110 or 120 and the maximum HARQ index value supported by the receiving STA 110 or 120 (S3030). For example, according to an implicit method, the transmitting STA 110 or 120 may set a smaller value of the maximum HARQ index values that the transmitting STA 110 or 120 and the receiving STA 110 or 120 can support as the number of HARQ indexes to be used for communication with the receiving STA 110 or 120, and the receiving STA 110 or 120 may also set the smaller value of the maximum HARQ index values that the transmitting STA 110 or 120 and the receiving STA 110 or 120 can support as the number of HARQ indexes to be used for communication with the transmitting STA 110 or 120. For example, according to an explicit method, the transmitting STA 110 or 120 may set the smaller value of the maximum HARQ index values that the transmitting STA 110 or 120 and the receiving STA 110 or 120 can support as the number of HARQ indexes to be used for the communication with the receiving STA 110 or 120 and may transmit information related to the set number of HARQ indexes to the receiving STA 110 or 120.

The transmitting STA 110 or 120 may perform association with the receiving STA 110 or 120 (S3040). For example, the transmitting STA 110 or 120 may perform connection with the receiving STA 110 or 120 based on the determined number of HARQ indexes and the information related to the time limit.

The transmitting STA 110 or 120 may transmit data (or a PPDU including data) to the receiving STA 110 or 120 (S3050). The transmitting STA 110 or 120 may store data in a buffer before or after transmitting the data. The data transmitted by the transmitting STA 110 or 120 in S3050 may be included in a TX PPDU, and an example of the TX PPDU may be as illustrated in FIG. 18. For example, a TX signal (e.g., the TX PPDU) related to S2930 may include identification information on the receiving STA 110 or 120. For example, the identification information on the receiving STA 110 or 120 may be all or some bits of an AID of the receiving STA 110 or 120, all or some bits of an MAC ID thereof, and the like. The transmitting STA 110 or 120 may insert the identification information on the receiving STA 110 or 120 into the TX signal by various methods. For example, the identification information on the receiving STA 110 or 120 may be inserted into an information bit of a signal field (e.g., a SIG-A, a SIG-B, and the like) of FIG. 18. That is, the information bit of the signal field (e.g., the SIG-A, the SIG-B, and the like) of FIG. 18 may include a subfield related to the identification information on the receiving STA 110 or 120. Alternatively, all or part (e.g., a CRC bit) of the information bit of the signal field (e.g., the SIG-A, the SIG-B, and the like) of FIG. 18 may be scrambled with the identification information on the receiving STA 110 or 120. For example, all/part of the signal field may be scrambled with the identification information on the receiving STA 110 or 120 based on an XOR operation or the like.

The transmitting STA 110 or 120 may receive a NACK from the receiving STA 110 or 120 (S3060). Upon receiving the NACK, the transmitting STA 110 or 120 may identify that the receiving STA 110 or 120 has failed to decode the data. When the time limit for the data expires, the transmitting STA 110 or 120 may flush the buffer (S3070). When the time limit for the data does not expire, the transmitting STA 110 or 120 may retransmit the data. For example, when the time limit for the data does not expire, the transmitting STA 110 or 120 may transmit a different redundancy version of the data to the receiving STA 110 or 120.

Figure 31:
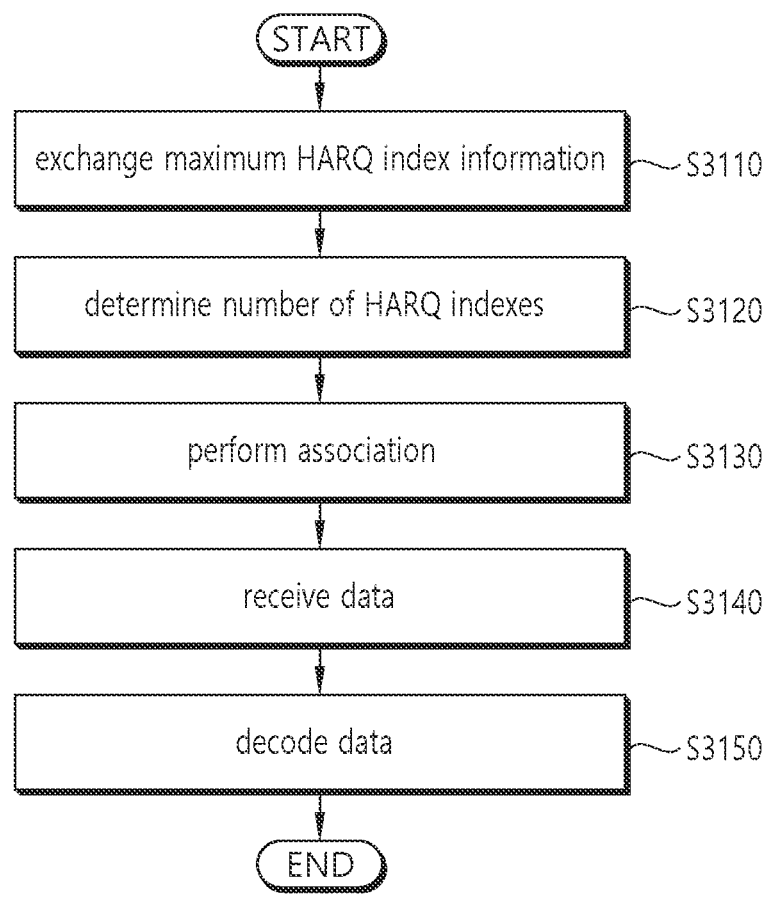
FIG. 31 to FIG. 33 are flowcharts illustrating embodiments of the operation of a receiving STA 110 or 120.

FIG. 31 is a flowchart illustrating an embodiment of the operation of a receiving STA 110 or 120.

Referring to FIG. 31, the receiving STA 110 or 120 may exchange maximum HARQ index information with a transmitting STA 110 or 120 (S3110). For example, as illustrated in FIG. 25, the receiving STA 110 or 120 may transmit information related to a maximum HARQ index value of the receiving STA 110 or 120 to the transmitting STA 110 or 120 and may receive information related to a maximum HARQ index value of the transmitting STA 110 or 120 from the transmitting STAs 110 and 120. For example, the pieces of information related to the maximum HARQ index value may respectively include information on a maximum HARQ index value supported by the receiving STA 110 or 120 in reception and information on a maximum HARQ index value supported by the transmitting STA 110 or 120 in transmission. The information related to the maximum HARQ index value may be included in, for example, a beacon frame, an association request frame, an association response frame, a probe request frame, a probe response frame, and the like.

The receiving STA 110 or 120 may determine the number of HARQ indexes based on the maximum HARQ index value supported by the receiving STA 110 or 120 and the maximum HARQ index value supported by the transmitting STA 110 or 120 (S3120). For example, according to an implicit method, the transmitting STA 110 or 120 may set a smaller value of the maximum HARQ index values that the transmitting STA 110 or 120 and the receiving STA 110 or 120 can support as the number of HARQ indexes to be used for communication with the receiving STA 110 or 120, and the receiving STA 110 or 120 may also set the smaller value of the maximum HARQ index values that the transmitting STA 110 or 120 and the receiving STA 110 or 120 can support as the number of HARQ indexes to be used for communication with the transmitting STA 110 or 120. For example, according to an explicit method, the transmitting STA 110 or 120 may set the smaller value of the maximum HARQ index values that the transmitting STA 110 or 120 and the receiving STA 110 or 120 can support as the number of HARQ indexes to be used for the communication with the receiving STA 110 or 120 and may transmit information related to the set number of HARQ indexes to the receiving STA 110 or 120. The receiving STA 110 or 120 may set the number of HARQ indexes based on the number of HARQ indexes received from the transmitting STA 110 or 120.

The receiving STA 110 or 120 may perform association with the transmitting STA 110 or 120 (S3130). For example, the receiving STA 110 or 120 may perform connection with the transmitting STA 110 or 120 based on the determined number of HARQ indexes.

The receiving STA 110 or 120 may receive data from the transmitting STA 110 or 120 based on the number of HARQ indexes (S3140). The receiving STA 110 or 120 may decode the received data (S3150). The embodiment of FIG. 31 may further include various operations not shown. For example, the receiving STA 110 or 120 may obtain an identifier included in a received signal, and may perform a subsequent decoding operation only when the obtained identifier matches an identifier of the receiving STA 110 or 120. As described in FIG. 28, a signal transmitted by the transmitting STA 110 or 120 may include identification information on the receiving STA 110 or 120 by various methods. As described above, all or part (e.g., a CRC bit) of an information bit of a signal field (e.g., the SIG-A, the SIG-B, and the like) may be scrambled with the identification information on the receiving STA 110 or 120. The receiving STA 110 or 120 may obtain the intended identifier of the receiving STA 110 or 120 based on a specific bit/field of the received signal, and may perform the subsequent decoding operation only when the obtained identifier matches the identifier of the receiving STA 110 or 120.

Figure 32:
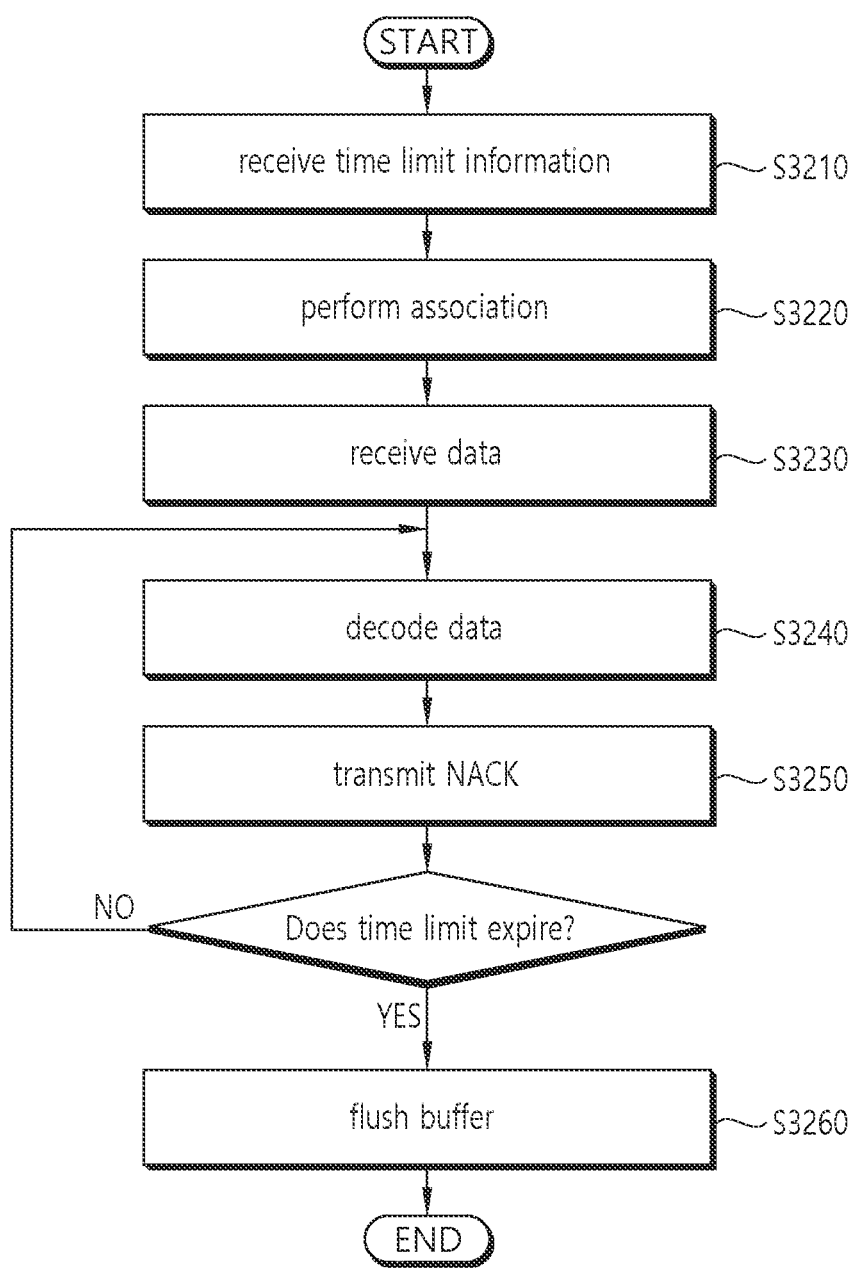

FIG. 32 is a flowchart illustrating an embodiment of the operation of a receiving STA 110 or 120.

Referring to FIG. 32, the receiving STA 110 or 120 may receive information related to a time limit from a transmitting STA 110 or 120 (S3210). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The receiving STA 110 or 120 may perform association with the receiving STA 110 or 120 (S3220). For example, the receiving STA 110 or 120 may perform connection with the transmitting STA 110 or 120 based on the information related to the time limit.

The receiving STA 110 or 120 may receive data (or a PPDU including data) from the transmitting STA 110 or 120 (S3230). The receiving STA 110 or 120 may decode the received data (S3240). The embodiment of FIG. 32 may further include various operations not shown. For example, the receiving STA 110 or 120 may obtain an identifier included in a received signal, and may perform a subsequent decoding operation only when the obtained identifier matches an identifier of the receiving STA 110 or 120. As described in FIG. 29, a signal transmitted by the transmitting STA 110 or 120 may include identification information on the receiving STA 110 or 120 by various methods. As described above, all or part (e.g., a CRC bit) of an information bit of a signal field (e.g., the SIG-A, the SIG-B, and the like) may be scrambled with the identification information on the receiving STA 110 or 120. The receiving STA 110 or 120 may obtain the intended identifier of the receiving STA 110 or 120 based on a specific bit/field of the received signal, and may perform the subsequent decoding operation only when the obtained identifier matches the identifier of the receiving STA 110 or 120.

When failing in decoding in operation 3240, the receiving STA 110 or 120 may transmit a NACK to the transmitting STA 110 or 120 (S3250). When the time limit for the data expires, the receiving STA 110 or 120 may flush a buffer (S3260). When the time limit for the data does not expire, the receiving STA 110 or 120 may not flush the buffer. For example, when the time limit for the data does not expire, the receiving STA 110 or 120 may receive the data retransmitted from the transmitting STA 110 or 120. The receiving STA 110 or 120 may combine a different redundancy version (e.g., a second redundancy version) of the data retransmitted from the transmitting STA 110 or 120 and the data (e.g., a first redundancy version) stored in the buffer and may decode the data.

Figure 33:
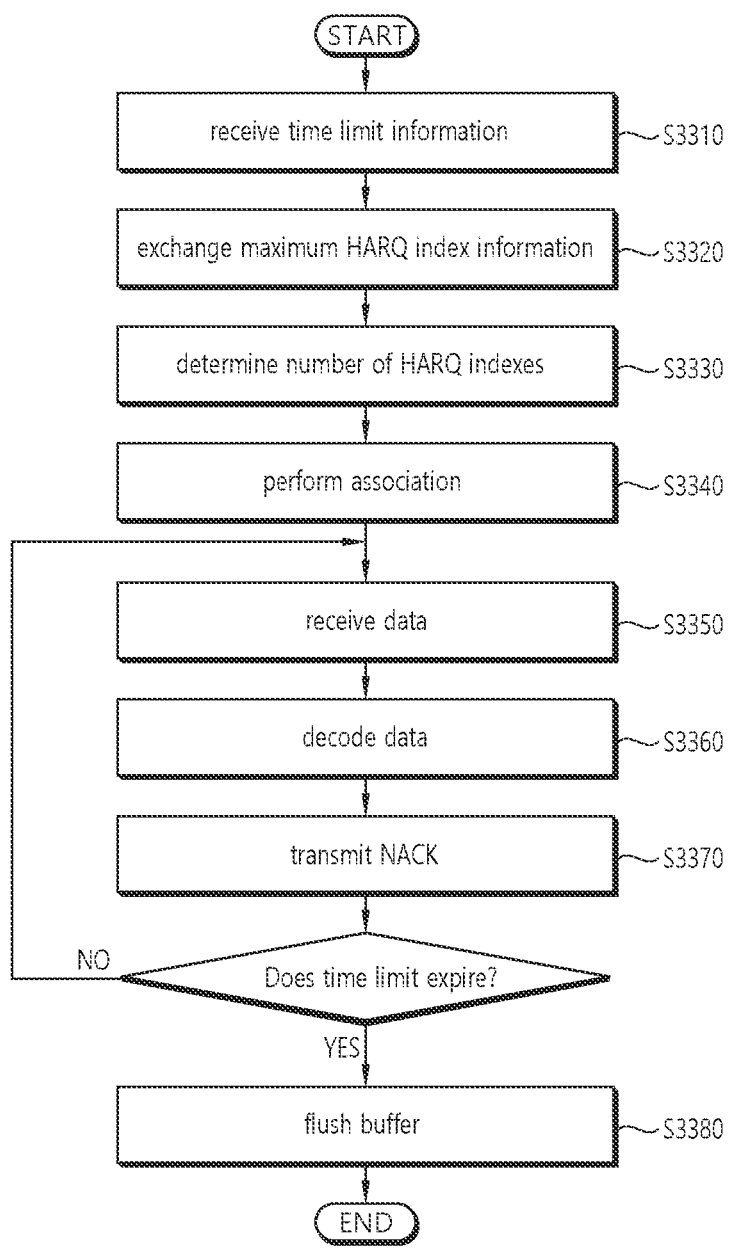

FIG. 33 is a flowchart illustrating an embodiment of the operation of a receiving STA 110 or 120.

Referring to FIG. 33, the receiving STA 110 or 120 may receive information related to a time limit from a transmitting STA 110 or 120 (S3310). For example, the transmitting STA 110 or 120 may report a time limit value (or the maximum allowed number of retransmissions) through a beacon frame, an association request frame, an association response frame, a probe request frame, a probe response frame, and the like, and the receiving STA 110 or 120 may confirm the time limit value through a response frame. For example, the receiving STA 110 or 120 may first request the transmitting STA 110 or 120 to change a time limit value.

The receiving STA 110 or 120 may exchange maximum HARQ index information with the transmitting STA 110 and 120 (S3320). For example, as illustrated in FIG. 25, the receiving STA 110 or 120 may transmit information related to a maximum HARQ index value of the receiving STA 110 or 120 to the transmitting STA 110 or 120 and may receive information related to a maximum HARQ index value of the transmitting STA 110 or 120 from the transmitting STAs 110 and 120. For example, the pieces of information related to the maximum HARQ index value may respectively include information on a maximum HARQ index value supported by the receiving STA 110 or 120 in reception and information on a maximum HARQ index value supported by the transmitting STA 110 or 120 in transmission. The information related to the maximum HARQ index value may be included in, for example, a beacon frame, an association request frame, an association response frame, a probe request frame, a probe response frame, and the like.

The receiving STA 110 or 120 may determine the number of HARQ indexes based on the maximum HARQ index value supported by the receiving STA 110 or 120 and the maximum HARQ index value supported by the transmitting STA 110 or 120 (S3330). For example, according to an implicit method, the transmitting STA 110 or 120 may set a smaller value of the maximum HARQ index values that the transmitting STA 110 or 120 and the receiving STA 110 or 120 can support as the number of HARQ indexes to be used for communication with the receiving STA 110 or 120, and the receiving STA 110 or 120 may also set the smaller value of the maximum HARQ index values that the transmitting STA 110 or 120 and the receiving STA 110 or 120 can support as the number of HARQ indexes to be used for communication with the transmitting STA 110 or 120. For example, according to an explicit method, the transmitting STA 110 or 120 may set the smaller value of the maximum HARQ index values that the transmitting STA 110 or 120 and the receiving STA 110 or 120 can support as the number of HARQ indexes to be used for the communication with the receiving STA 110 or 120 and may transmit information related to the set number of HARQ indexes to the receiving STA 110 or 120. The receiving STA 110 or 120 may set the number of HARQ indexes based on the number of HARQ indexes received from the transmitting STA 110 or 120.

The receiving STA 110 or 120 may perform association with the transmitting STA 110 or 120 (S3340). For example, the receiving STA 110 or 120 may perform connection with the transmitting STA 110 or 120 based on the determined number of HARQ indexes and the information related to the time limit.

The receiving STA 110 or 120 may receive data (or a PPDU including data) from the transmitting STA 110 or 120 (S3350). The receiving STA 110 or 120 may decode the received data (S3360). The embodiment of FIG. 33 may further include various operations not shown. For example, the receiving STA 110 or 120 may obtain an identifier included in a received signal, and may perform a subsequent decoding operation only when the obtained identifier matches an identifier of the receiving STA 110 or 120. As described in FIG. 30, a signal transmitted by the transmitting STA 110 or 120 may include identification information on the receiving STA 110 or 120 by various methods. As described above, all or part (e.g., a CRC bit) of an information bit of a signal field (e.g., the SIG-A, the SIG-B, and the like) may be scrambled with the identification information on the receiving STA 110 or 120. The receiving STA 110 or 120 may obtain the intended identifier of the receiving STA 110 or 120 based on a specific bit/field of the received signal, and may perform the subsequent decoding operation only when the obtained identifier matches the identifier of the receiving STA 110 or 120.

When failing in decoding in operation 3360, the receiving STA 110 or 120 may transmit a NACK to the transmitting STA 110 or 120 (S3370). When the time limit for the data expires, the receiving STA 110 or 120 may flush a buffer (S3380). When the time limit for the data does not expire, the receiving STA 110 or 120 may not flush the buffer. For example, when the time limit for the data does not expire, the receiving STA 110 or 120 may receive the data retransmitted from the transmitting STA 110 or 120. The receiving STA 110 or 120 may combine a different redundancy version (e.g., a second redundancy version) of the data retransmitted from the transmitting STA 110 or 120 and the data (e.g., a first redundancy version) stored in the buffer and may decode the data.

Some of the specific operations illustrated in the embodiments of FIG. 28 to FIG. 33 may be omitted, and other operations may be added.

When the embodiments are implemented in software, the techniques described herein may be implemented with modules (e.g., procedures, functions, and the like) that perform the functions described herein. The modules may be stored in a memory and may be executed by a processor. The memory may be disposed inside or outside the processor and may be connected to the processor via various well-known devices.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method used in a wireless local area network (WLAN) system, the method comprising:
    transmitting, by a first station (STA), first information related to a maximum value of a hybrid automatic repeat request (HARQ) index supported by the first STA and second information related to a time limit related to the HARQ index, the HARQ index being used for an HARQ operation of the first STA and the time limit being used for a maximum storage time of an HARQ buffer related to the HARQ index;
    performing, by the first STA, association with a second STA based on the first information and the second information; and
    receiving, by the first STA, third information related to a maximum value of an HARQ index supported by the second STA,
    wherein the HARQ operation of the first STA is performed based on a first value that is a smaller value of the maximum value of the HARQ index supported by the first STA and the maximum value of the HARQ index supported by the second STA.

2. The method of claim 1, wherein each of the first information and the second information is comprised in at least one of a beacon frame, an association request frame, an association response frame, a probe request frame, and a probe response frame.

3. The method of claim 1, comprising
    flushing, by the first STA, the HARQ buffer related to the HARQ index when the time limit expires.

4. The method of claim 1, wherein the information related to the maximum value of the HARQ index comprises information on a number of HARQ units comprisable in one physical protocol data unit (PPDU),
    the HARQ unit is a data retransmission unit, and
    one HARQ unit is allocated to each HARQ index.

5. The method of claim 1, further comprising
    transmitting, by the first STA, a PPDU to the second STA,
    wherein the first value is comprised in a SIG field of the PPDU.

6. The method of claim 1, wherein the first information comprises information related to a maximum value of an HARQ index supported by the first STA when transmitting a PPDU and information related to a maximum value of an HARQ index supported by the first STA when receiving a PPPDU.

7. The method of claim 1, wherein the second information comprises information related to a time limit related to an HARQ index for each access category.

8. A first station (STA) used in a wireless local area network (WLAN) system, the first STA comprising:
    a transceiver to transmit and receive a radio signal; and
    a processor connected to the transceiver,
    wherein the processor is configured to:
        transmit first information related to a maximum value of a hybrid automatic repeat request (HARQ) index supported by the first STA and second information related to a time limit related to the HARQ index, the HARQ index being used for an HARQ operation of the first STA and the time limit being used for a maximum storage time of an HARQ buffer related to the HARQ index;
        perform association with a second STA based on the first information and the second information; and receive third information related to a maximum value of an HARQ index supported by the second STA, wherein the HARQ operation of the first STA is performed based on a first value that is a smaller value of the maximum value of the HARQ index supported by the first STA and the maximum value of the HARQ index supported by the second STA.

9. The first STA of claim 8, wherein each of the first information and the second information is comprised in at least one of a beacon frame, an association request frame, an association response frame, a probe request frame, and a probe response frame.

10. The first STA of claim 8, wherein the processor is configured to flush the HARQ buffer related to the HARQ index when the time limit expires.

11. The first STA of claim 8, wherein the information related to the maximum value of the HARQ index comprises information on a number of HARQ units comprisable in one physical protocol data unit (PPDU), the HARQ unit is a data retransmission unit, and
one HARQ unit is allocated to each HARQ index.

12. The first STA of claim 8, wherein the processor is configured to transmit a PPDU to the second STA, and wherein the first value is comprised in a SIG field of the PPDU.

13. The first STA of claim 8, wherein the first information comprises information related to a maximum value of an HARQ index supported by the first STA when transmitting a PPDU and information related to a maximum value of an HARQ index supported by the first STA when receiving a PPPDU.

14. The first STA of claim 8, wherein the second information comprises information related to a time limit related to an HARQ index for each access category.

* * * * *